(12) United States Patent
Hodge et al.

(10) Patent No.: US 8,255,640 B2
(45) Date of Patent: *Aug. 28, 2012

(54) MEDIA DEVICE WITH INTELLIGENT CACHE UTILIZATION

(75) Inventors: Andrew Bert Hodge, Palo Alto, CA (US); David John Tupman, San Francisco, CA (US); Guy Bar-Nahum, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 630 days.

This patent is subject to a terminal disclaimer.

(21) Appl. No.: 11/583,199

(22) Filed: Oct. 18, 2006

(65) Prior Publication Data

US 2007/0156962 A1    Jul. 5, 2007

Related U.S. Application Data

(60) Provisional application No. 60/756,096, filed on Jan. 3, 2006.

(51) Int. Cl.
*G06F 13/00* (2006.01)
(52) U.S. Cl. .................................... 711/154; 711/163
(58) Field of Classification Search .............. 711/154, 711/163
See application file for complete search history.

(56) References Cited

U.S. PATENT DOCUMENTS

| | | |
|---|---|---|
| 4,090,216 A | 5/1978 | Constable |
| 4,386,345 A | 5/1983 | Narveson et al. |
| 4,451,849 A | 5/1984 | Fuhrer |
| 4,589,022 A | 5/1986 | Prince et al. |
| 4,908,523 A | 3/1990 | Snowden et al. |
| 4,928,307 A | 5/1990 | Lynn |
| 4,951,171 A | 8/1990 | Tran et al. |
| 5,185,906 A | 2/1993 | Brooks |
| 5,293,494 A | 3/1994 | Saito et al. |
| 5,379,057 A | 1/1995 | Clough et al. |
| 5,406,305 A | 4/1995 | Shimomura et al. |
| 5,559,945 A | 9/1996 | Beaudet et al. |
| 5,566,337 A | 10/1996 | Szymanski et al. |
| 5,583,993 A | 12/1996 | Foster et al. |
| 5,608,698 A | 3/1997 | Yamanoi et al. |

(Continued)

FOREIGN PATENT DOCUMENTS

DE            43 34 773 A1    4/1994

(Continued)

OTHER PUBLICATIONS

"Creative liefert erstes Portable Media Center aus" [Online] Sep. 2, 2004, Retrieved from the internet on Sep. 20, 2007 from http://www.golem.de/0409/33347.html>.

(Continued)

*Primary Examiner* — Reba I Elmore
(74) *Attorney, Agent, or Firm* — Beyer Law Group LLP

(57) ABSTRACT

A portable media device and a method for operating a portable media device are disclosed. According to one aspect, a battery-powered portable media device can manage use of a mass storage device to efficiently utilize battery power. By providing a cache memory and loading the cache memory so as to provide skip support, battery power for the portable media device can be conserved (i.e., efficiently consumed). According to another aspect, a portable media device can operate efficiently in a seek mode. The seek mode is an operational mode of the portable media device in which the portable media device automatically scans through media items to assist a user in selecting a desired one of the media items.

27 Claims, 13 Drawing Sheets

U.S. PATENT DOCUMENTS

| | | |
|---|---|---|
| 5,616,876 A | 4/1997 | Cluts |
| 5,617,386 A | 4/1997 | Choi |
| 5,670,985 A | 9/1997 | Cappels, Sr. et al. |
| 5,675,362 A | 10/1997 | Clough et al. |
| 5,684,513 A | 11/1997 | Decker |
| 5,710,922 A | 1/1998 | Alley et al. |
| 5,712,949 A | 1/1998 | Kato et al. |
| 5,717,422 A | 2/1998 | Fergason |
| 5,721,949 A | 2/1998 | Smith et al. |
| 5,726,672 A | 3/1998 | Hernandez et al. |
| 5,739,451 A | 4/1998 | Winksy et al. |
| 5,740,143 A | 4/1998 | Suetomi |
| 5,760,588 A | 6/1998 | Bailey |
| 5,778,374 A | 7/1998 | Dang et al. |
| 5,803,786 A | 9/1998 | McCormick |
| 5,815,225 A | 9/1998 | Nelson |
| 5,822,288 A | 10/1998 | Shinada |
| 5,835,721 A | 11/1998 | Donahue et al. |
| 5,835,732 A | 11/1998 | Kikinis et al. |
| 5,838,969 A | 11/1998 | Jacklin et al. |
| 5,864,868 A | 1/1999 | Contois |
| 5,867,163 A * | 2/1999 | Kurtenbach ............... 715/840 |
| 5,870,710 A | 2/1999 | Ozawa et al. |
| 5,918,303 A | 6/1999 | Yamaura et al. |
| 5,920,728 A | 7/1999 | Hallowell et al. |
| 5,923,757 A | 7/1999 | Hocker et al. |
| 5,952,992 A | 9/1999 | Helms |
| 6,006,274 A | 12/1999 | Hawkins et al. |
| 6,009,237 A | 12/1999 | Hirabayashi et al. |
| 6,011,585 A | 1/2000 | Anderson |
| 6,018,705 A | 1/2000 | Gaudet et al. |
| 6,041,023 A | 3/2000 | Lakhansingh |
| 6,052,654 A | 4/2000 | Gaudet et al. |
| 6,108,426 A | 8/2000 | Stortz |
| 6,122,340 A | 9/2000 | Darley et al. |
| 6,158,019 A * | 12/2000 | Squibb ............... 714/13 |
| 6,161,944 A | 12/2000 | Leman |
| 6,172,948 B1 | 1/2001 | Keller et al. |
| 6,179,432 B1 | 1/2001 | Zhang et al. |
| 6,185,163 B1 | 2/2001 | Bickford et al. |
| 6,191,939 B1 | 2/2001 | Burnett |
| 6,208,044 B1 | 3/2001 | Viswanadham et al. |
| 6,216,131 B1 | 4/2001 | Liu et al. |
| 6,217,183 B1 | 4/2001 | Shipman |
| 6,248,946 B1 | 6/2001 | Dwek |
| 6,295,541 B1 | 9/2001 | Bodnar et al. |
| 6,297,795 B1 | 10/2001 | Kato et al. |
| 6,298,314 B1 | 10/2001 | Blackadar et al. |
| 6,332,175 B1 * | 12/2001 | Birrell et al. ............... 711/112 |
| 6,336,365 B1 | 1/2002 | Blackadar et al. |
| 6,336,727 B1 | 1/2002 | Kim |
| 6,341,316 B1 | 1/2002 | Kloba et al. |
| 6,357,147 B1 | 3/2002 | Darley et al. |
| 6,377,530 B1 | 4/2002 | Burrows |
| 6,452,610 B1 | 9/2002 | Reinhardt et al. |
| 6,467,924 B2 | 10/2002 | Shipman |
| 6,493,652 B1 | 12/2002 | Ohlenbusch et al. |
| 6,536,139 B2 | 3/2003 | Darley et al. |
| 6,549,497 B2 | 4/2003 | Miyamoto et al. |
| 6,560,903 B1 | 5/2003 | Darley |
| 6,587,403 B1 | 7/2003 | Keller et al. |
| 6,587,404 B1 | 7/2003 | Keller et al. |
| 6,605,038 B1 | 8/2003 | Teller et al. |
| 6,606,281 B2 | 8/2003 | Cowgill et al. |
| 6,611,607 B1 | 8/2003 | Davis et al. |
| 6,611,789 B1 | 8/2003 | Darley |
| 6,617,963 B1 | 9/2003 | Watters et al. |
| 6,621,768 B1 | 9/2003 | Keller et al. |
| 6,623,427 B2 | 9/2003 | Mandigo |
| 6,631,101 B1 | 10/2003 | Chan et al. |
| 6,693,612 B1 | 2/2004 | Matsumoto et al. |
| 6,731,312 B2 | 5/2004 | Robbin |
| 6,760,536 B1 | 7/2004 | Amir et al. |
| 6,762,741 B2 | 7/2004 | Weindorf |
| 6,781,611 B1 | 8/2004 | Richard |
| 6,794,566 B2 | 9/2004 | Pachet |
| 6,799,226 B1 * | 9/2004 | Robbin et al. ............... 710/15 |
| 6,801,964 B1 | 10/2004 | Mahdavi |
| 6,832,373 B2 | 12/2004 | O'Neill |
| 6,844,511 B1 | 1/2005 | Hsu et al. |
| 6,870,529 B1 | 3/2005 | Davis |
| 6,871,063 B1 | 3/2005 | Schiffer |
| 6,876,947 B1 | 4/2005 | Darley et al. |
| 6,882,955 B1 | 4/2005 | Ohlenbusch et al. |
| 6,886,749 B2 | 5/2005 | Chiba et al. |
| 6,898,550 B1 | 5/2005 | Blackadar et al. |
| 6,911,971 B2 | 6/2005 | Suzuki et al. |
| 6,918,677 B2 | 7/2005 | Shipman |
| 6,931,377 B1 | 8/2005 | Seya |
| 6,934,812 B1 * | 8/2005 | Robbin et al. ............... 711/138 |
| 6,950,087 B2 | 9/2005 | Knox et al. |
| 7,010,365 B2 | 3/2006 | Maymudes |
| 7,028,096 B1 * | 4/2006 | Lee ............... 709/231 |
| 7,046,230 B2 | 5/2006 | Zadesky |
| 7,062,225 B2 | 6/2006 | White |
| 7,076,561 B1 | 7/2006 | Rosenberg et al. |
| 7,084,856 B2 | 8/2006 | Huppi |
| 7,084,921 B1 | 8/2006 | Ogawa |
| 7,092,946 B2 | 8/2006 | Bodnar |
| 7,124,125 B2 | 10/2006 | Cook et al. |
| 7,131,059 B2 | 10/2006 | Obrador |
| 7,143,241 B2 | 11/2006 | Hull |
| 7,146,437 B2 | 12/2006 | Robbin et al. |
| 7,171,331 B2 | 1/2007 | Vock et al. |
| 7,191,244 B2 | 3/2007 | Jennings et al. |
| 7,213,228 B2 | 5/2007 | Putterman |
| 7,234,026 B2 | 6/2007 | Robbin et al. |
| 7,277,928 B2 | 10/2007 | Lennon |
| 7,301,857 B2 | 11/2007 | Shah et al. |
| 7,356,679 B1 * | 4/2008 | Le et al. ............... 713/1 |
| 7,508,535 B2 * | 3/2009 | Hart et al. ............... 358/1.15 |
| 7,515,431 B1 * | 4/2009 | Zadesky et al. ............... 361/752 |
| 7,536,565 B2 * | 5/2009 | Girish et al. ............... 713/300 |
| 7,593,782 B2 * | 9/2009 | Jobs et al. ............... 700/94 |
| 2001/0013983 A1 | 8/2001 | Izawa et al. |
| 2001/0029178 A1 | 10/2001 | Criss et al. |
| 2001/0037367 A1 | 11/2001 | Iyer |
| 2001/0041021 A1 | 11/2001 | Boyle et al. |
| 2001/0042107 A1 | 11/2001 | Palm |
| 2002/0002413 A1 | 1/2002 | Tokue |
| 2002/0013784 A1 | 1/2002 | Swanson |
| 2002/0028683 A1 | 3/2002 | Banatre et al. |
| 2002/0045961 A1 | 4/2002 | Gibbs et al. |
| 2002/0046315 A1 | 4/2002 | Miller et al. |
| 2002/0055934 A1 | 5/2002 | Lipscomb et al. |
| 2002/0059440 A1 * | 5/2002 | Hudson et al. ............... 709/231 |
| 2002/0059499 A1 * | 5/2002 | Hudson ............... 711/118 |
| 2002/0090912 A1 | 7/2002 | Cannon et al. |
| 2002/0116082 A1 | 8/2002 | Gudorf |
| 2002/0116517 A1 * | 8/2002 | Hudson et al. ............... 709/231 |
| 2002/0122031 A1 | 9/2002 | Maglio et al. |
| 2002/0123359 A1 | 9/2002 | Wei et al. |
| 2002/0152045 A1 | 10/2002 | Dowling et al. |
| 2002/0156833 A1 | 10/2002 | Maurya et al. |
| 2002/0161865 A1 | 10/2002 | Nguyen |
| 2002/0173273 A1 | 11/2002 | Spurgat et al. |
| 2002/0189426 A1 | 12/2002 | Hirade et al. |
| 2002/0189429 A1 | 12/2002 | Qian et al. |
| 2002/0199043 A1 | 12/2002 | Yin |
| 2003/0002688 A1 | 1/2003 | Kanevsky et al. |
| 2003/0007001 A1 | 1/2003 | Zimmerman |
| 2003/0018799 A1 | 1/2003 | Eyal |
| 2003/0037254 A1 | 2/2003 | Fischer et al. |
| 2003/0046434 A1 | 3/2003 | Flanagin et al. |
| 2003/0050092 A1 | 3/2003 | Yun |
| 2003/0074457 A1 | 4/2003 | Kluth |
| 2003/0076301 A1 | 4/2003 | Tsuk et al. |
| 2003/0076306 A1 | 4/2003 | Zadesky |
| 2003/0079038 A1 | 4/2003 | Robbin et al. |
| 2003/0095096 A1 * | 5/2003 | Robbin et al. ............... 345/156 |
| 2003/0097379 A1 | 5/2003 | Ireton |
| 2003/0104835 A1 | 6/2003 | Douhet |
| 2003/0127307 A1 | 7/2003 | Liu et al. |
| 2003/0128192 A1 | 7/2003 | van Os |
| 2003/0133694 A1 | 7/2003 | Yeo |
| 2003/0153213 A1 | 8/2003 | Siddiqui et al. |
| 2003/0156503 A1 | 8/2003 | Schilling et al. |

| Publication No. | Date | Inventor |
|---|---|---|
| 2003/0167318 A1 | 9/2003 | Robbin et al. |
| 2003/0176935 A1 | 9/2003 | Lian et al. |
| 2003/0182100 A1 | 9/2003 | Plastina et al. |
| 2003/0221541 A1 | 12/2003 | Platt |
| 2003/0229490 A1 | 12/2003 | Etter |
| 2003/0236695 A1* | 12/2003 | Litwin, Jr. .................. 705/10 |
| 2004/0001395 A1 | 1/2004 | Keller et al. |
| 2004/0001396 A1 | 1/2004 | Keller et al. |
| 2004/0012556 A1 | 1/2004 | Yong et al. |
| 2004/0019658 A1* | 1/2004 | Plastina et al. .............. 709/217 |
| 2004/0055446 A1 | 3/2004 | Robbin et al. |
| 2004/0066363 A1 | 4/2004 | Yamano et al. |
| 2004/0069122 A1 | 4/2004 | Wilson |
| 2004/0076086 A1 | 4/2004 | Keller |
| 2004/0078383 A1* | 4/2004 | Mercer et al. .............. 707/102 |
| 2004/0086120 A1 | 5/2004 | Akins, III et al. |
| 2004/0094018 A1 | 5/2004 | Ueshima et al. |
| 2004/0103411 A1 | 5/2004 | Thayer |
| 2004/0125522 A1 | 7/2004 | Chiu et al. |
| 2004/0165302 A1 | 8/2004 | Lu |
| 2004/0177063 A1* | 9/2004 | Weber et al. .............. 707/3 |
| 2004/0198436 A1 | 10/2004 | Alden |
| 2004/0210628 A1 | 10/2004 | Inkinen et al. |
| 2004/0216108 A1 | 10/2004 | Robbin |
| 2004/0224638 A1 | 11/2004 | Fadell et al. |
| 2004/0242224 A1 | 12/2004 | Janik et al. |
| 2004/0246275 A1 | 12/2004 | Yoshihara et al. |
| 2004/0255135 A1 | 12/2004 | Kitaya et al. |
| 2004/0267825 A1 | 12/2004 | Novak et al. |
| 2005/0015254 A1 | 1/2005 | Beaman |
| 2005/0053365 A1 | 3/2005 | Adams et al. |
| 2005/0060240 A1 | 3/2005 | Popofsky |
| 2005/0060542 A1 | 3/2005 | Risan et al. |
| 2005/0108754 A1* | 5/2005 | Carhart et al. .............. 725/47 |
| 2005/0111820 A1 | 5/2005 | Matsumi et al. |
| 2005/0122315 A1 | 6/2005 | Chalk et al. |
| 2005/0123886 A1 | 6/2005 | Hua et al. |
| 2005/0146534 A1* | 7/2005 | Fong et al. .............. 345/619 |
| 2005/0149213 A1 | 7/2005 | Guzak et al. |
| 2005/0149872 A1* | 7/2005 | Fong et al. .............. 715/727 |
| 2005/0152294 A1 | 7/2005 | Yu et al. |
| 2005/0156047 A1 | 7/2005 | Chiba et al. |
| 2005/0160270 A1 | 7/2005 | Goldberg et al. |
| 2005/0166153 A1 | 7/2005 | Eytchison et al. |
| 2005/0216855 A1 | 9/2005 | Kopra et al. |
| 2005/0218303 A1 | 10/2005 | Poplin |
| 2005/0234983 A1* | 10/2005 | Plastina et al. .............. 707/104.1 |
| 2005/0245839 A1 | 11/2005 | Stivoric et al. |
| 2005/0246324 A1 | 11/2005 | Paalasmaa et al. |
| 2005/0248555 A1 | 11/2005 | Feng et al. |
| 2005/0257169 A1* | 11/2005 | Tu .............. 715/810 |
| 2005/0259064 A1 | 11/2005 | Sugino et al. |
| 2005/0259524 A1 | 11/2005 | Yeh |
| 2005/0259758 A1 | 11/2005 | Razzell |
| 2005/0270276 A1* | 12/2005 | Sugimoto et al. .............. 345/173 |
| 2006/0013414 A1 | 1/2006 | Shih |
| 2006/0025068 A1* | 2/2006 | Regan et al. .............. 455/3.01 |
| 2006/0026424 A1 | 2/2006 | Eto |
| 2006/0061563 A1 | 3/2006 | Fleck |
| 2006/0068760 A1 | 3/2006 | Hameed et al. |
| 2006/0071899 A1 | 4/2006 | Chang et al. |
| 2006/0088228 A1 | 4/2006 | Marriott et al. |
| 2006/0092122 A1 | 5/2006 | Yoshihara et al. |
| 2006/0094409 A1 | 5/2006 | Inselberg |
| 2006/0095502 A1* | 5/2006 | Lewis et al. .............. 709/203 |
| 2006/0098320 A1* | 5/2006 | Koga et al. .............. 360/53 |
| 2006/0135883 A1 | 6/2006 | Jonsson et al. |
| 2006/0145053 A1 | 7/2006 | Stevenson et al. |
| 2006/0152382 A1 | 7/2006 | Hiltunen |
| 2006/0155914 A1 | 7/2006 | Jobs et al. |
| 2006/0170535 A1 | 8/2006 | Watters et al. |
| 2006/0173974 A1* | 8/2006 | Tang .............. 709/217 |
| 2006/0190577 A1 | 8/2006 | Yamada |
| 2006/0190980 A1 | 8/2006 | Kikkoji et al. |
| 2006/0221057 A1 | 10/2006 | Fux et al. |
| 2006/0221788 A1 | 10/2006 | Lindahl et al. |
| 2006/0265503 A1 | 11/2006 | Jones et al. |
| 2006/0272483 A1 | 12/2006 | Honeywell |
| 2006/0277336 A1 | 12/2006 | Lu et al. |
| 2007/0014536 A1* | 1/2007 | Hellman .............. 386/94 |
| 2007/0028009 A1 | 2/2007 | Robbin et al. |
| 2007/0038941 A1* | 2/2007 | Wysocki et al. .............. 715/748 |
| 2007/0055743 A1* | 3/2007 | Pirtle et al. .............. 709/217 |
| 2007/0061759 A1* | 3/2007 | Klein .............. 715/853 |
| 2007/0089057 A1 | 4/2007 | Kindig |
| 2007/0106660 A1 | 5/2007 | Stern et al. |
| 2007/0124679 A1 | 5/2007 | Jeong et al. |
| 2007/0129062 A1 | 6/2007 | Pantalone et al. |
| 2007/0135225 A1 | 6/2007 | Nieminen et al. |
| 2007/0248311 A1 | 10/2007 | Wice et al. |
| 2007/0255163 A1 | 11/2007 | Prineppi |
| 2008/0055228 A1 | 3/2008 | Glen |
| 2008/0134287 A1 | 6/2008 | Gudorf et al. |
| 2010/0077338 A1 | 3/2010 | Matthews et al. |

FOREIGN PATENT DOCUMENTS

| | | |
|---|---|---|
| DE | 44 45 023 A1 | 6/1996 |
| EP | 0 127 139 | 5/1984 |
| EP | 0578604 | 1/1994 |
| EP | 0 757 437 | 2/1997 |
| EP | 0 813 138 | 12/1997 |
| EP | 0 863 469 | 9/1998 |
| EP | 0 917 077 | 5/1999 |
| EP | 0 982 732 | 3/2000 |
| EP | 1 028 425 | 8/2000 |
| EP | 1028426 A2 | 8/2000 |
| EP | 1 076 302 | 2/2001 |
| EP | 1 213 643 | 6/2002 |
| EP | 1 289 197 | 3/2003 |
| EP | 1 503 363 | 2/2005 |
| EP | 1536612 | 6/2005 |
| EP | 1 566 743 | 8/2005 |
| EP | 1566948 | 8/2005 |
| EP | 1 372 133 | 12/2005 |
| EP | 1 686 496 | 8/2006 |
| GB | 2 370 208 | 6/2002 |
| GB | 2384399 | 7/2003 |
| GB | 2399639 | 5/2005 |
| JP | 59-023610 | 2/1984 |
| JP | 03-228490 | 10/1991 |
| JP | 04-243386 | 8/1992 |
| JP | 6-96520 | 4/1994 |
| JP | 8-235774 | 9/1996 |
| JP | 9-50676 | 2/1997 |
| JP | 9-259532 | 10/1997 |
| JP | 2000-90651 | 3/2000 |
| JP | 2000-224099 | 8/2000 |
| JP | 2000-285643 | 10/2000 |
| JP | 2000-299834 | 10/2000 |
| JP | 2000-311352 | 11/2000 |
| JP | 2000-339864 | 12/2000 |
| JP | 2001-236286 | 8/2001 |
| JP | 2001-312338 | 11/2001 |
| JP | 2002-076977 | 3/2002 |
| JP | 2002-175467 | 6/2002 |
| JP | 2003-188792 | 7/2003 |
| JP | 2003-259333 | 9/2003 |
| JP | 2003-319365 | 11/2003 |
| JP | 2004-021720 | 1/2004 |
| JP | 2004-219731 | 8/2004 |
| JP | 2004-220420 | 8/2004 |
| KR | 20010076508 | 8/2001 |
| WO | WO 01/33569 | 6/1995 |
| WO | WO 95/16950 | 6/1995 |
| WO | 98/17032 | 4/1998 |
| WO | WO 99/28813 | 6/1999 |
| WO | WO 00/22820 | 4/2000 |
| WO | WO 01/65413 | 9/2001 |
| WO | WO 01/67753 | 9/2001 |
| WO | WO 02/25610 | 3/2002 |
| WO | WO 03/023786 | 3/2003 |
| WO | WO 03/036457 | 5/2003 |
| WO | WO 03/067202 | 8/2003 |
| WO | 2004/061850 A1 | 7/2004 |
| WO | WO 2004/055637 | 7/2004 |
| WO | WO 2004/084413 A2 | 9/2004 |
| WO | WO 2004/104815 | 12/2004 |
| WO | WO 2005/031737 | 4/2005 |

| | | |
|---|---|---|
| WO | 2005/048644 | 5/2005 |
| WO | WO 2005/008505 | 7/2005 |
| WO | 2005/109781 | 11/2005 |
| WO | WO 2006/040737 | 4/2006 |
| WO | 2006/071364 | 6/2006 |

OTHER PUBLICATIONS

International Search Report dated Feb. 18, 2008 in Patent Application No. PCT/US2007/079766.
International Search Report Dated Sep. 27, 2007 in Application No. 05824296.7.
Office Action dated Apr. 4, 2008 in U.S. Appl. No. 11/212,555.
Office Action dated Feb. 20, 2008 in Japanese Application No. 2007-538196.
Office Action dated Feb. 25, 2008 in U.S. Appl. No. 11/749,599.
Office Action dated Mar. 4, 2008 from U.S. Appl. No. 10/973,657.
Partial International Search Report dated Feb. 1, 2008 in Patent Application No. PCT/US2007/010630.
Written Opinion dated Feb. 18, 2008 in Patent Application No. PCT/US2007/079766.
Invitation to Pay Additional Fees and Partial Search Report for PCT Application No. PCT/US2007/077160 dated Apr. 1, 2008.
"Combination Belt Clip Leaf Spring and Housing Latch", Wandt et al.; Motorola Technical Developments, Motorla Inc. Schaumburg, IL. vol. 18, Mar. 1, 1993.
Search Report dated Mar. 20, 2008 in Patent Application No. PCT/US2007/077789.
Written Opinion dated Mar. 20, 2008 in Patent Application No. PCT/US2007/077789.
Notification of Reason for Rejection from PCT Application No. 2003-539048 dated Nov. 27, 2007.
"Creative Zen Vision: M 30GB", Dec. 21, 2005; downloaded on Jan. 11, 2008 from http://web.archive.org/web/20051221050140/http://www.everthingusb.com/creative_zen_vision:m_30gb.html>.
International Search Report dated Jul. 7, 2008 in PCT Application No. PCT/US2007/076793.
International Search Report dated Jun. 10, 2008 in PCT Application No. PCT/US2007/010630.
Kadir et al., "Adaptive Fast Playback-Based Video Skimming Using a Compressed-Domain Visual Complexity Measure", 2004 IEEE International Conference on Multimedia and Expo, pp. 2055-2058.
Office Action dated Jun. 17, 2008 in U.S. Appl. No. 11/212,313.
Office Action dated May 30, 2008 in Chinese Patent Application No. 02825938.6.
Office Action dated Oct. 16, 2008 in U.S. Appl. No. 11/327,544.
Office Action in Japanese Patent Application No. 2008-045351 dated Aug. 5, 2008.
Office Action in U.S. Appl. No. 11/212,555 dated Aug. 14, 2008.
Search Report dated May 15, 2008 in PCT Application No. PCT/US2007/019578.
Written Opinion dated Jul. 7, 2008 in PCT Application No. PCT/US2007/076793.
Written Opinion dated Jun. 10, 2008 in PCT Application No. PCT/US2007/010630.
Written Opinion dated May 15, 2008 in PCT Application No. PCT/US2007/019578.
Yee et al., "Faceted Metadata for Image Search and Browsing." Association for Computing Machinery, Conference Proceedings, Apr. 5, 2003.
Apple iTunes Smart Playlists, downloaded Apr. 5, 2005 from http://web.archive.org/web/20031002011316/www.apple.com/itunes/smartplaylists . . . . pp. 1-2.
International Search Report dated Dec. 5, 2007 in Patent Application No. PCT/US2007/004810.
International Search Report dated Jan. 29, 2008 in Patent Application No. PCT/US2006/048738.
International Search Report in Patent Application No. PCT/US2007/007020 dated Jan. 28, 2008.
International Search Report in Patent Application No. PCT/US2007/076889 dated Jan. 28, 2008.
iTunes, Wikipedia: The Free Encyclopedia; downloaded on Oct. 5, 2005, pp. 1-6.
Nutzel et al., "Sharing Systems for Future HiFi Systems", The Computer Society, Jun. 2004.
Partial Search Report dated Sep. 6, 2007 in Patent Application No. PCT/US2007/004810.
Written Opinion dated Dec. 5, 2007 in PCT Application No. PCT/US2007/004810.
Written Opinion in Patent Application No. PCT/US2006/048738 dated Jan. 29, 2008.
Written Opinion in Patent Application No. PCT/US2007/076889 dated Jan. 28, 2008.
Written Opinion in Patent Application No. PCT/US2007/077020 dated Jan. 28, 2008.
Office Action dated Feb. 1, 2008 in U.S. Appl. No. 11/327,544.
Hart-Daves, Guy, "How to Do Everything with Your iPod and iPod Mini", 2004, McGraw-Hill Professional, p. 33.
Office Action dated Feb. 4, 2008 in U.S. Appl. No. 11/566,072.
International Search Report dated Jul. 2, 2007 in related case PCT/US2006/048669.
Apple iPod Technical Specifications, iPod 20GB and 60GB Mac + PC, downloaded from http://www.apple.com/ipod/color/specs.html on Aug. 8, 2005.
"Apple Announces iTunes 2," Press Release, Apple Computer, Inc., Oct. 23, 2001.
"Apple Introduces iTunes / World's Best and Easiest to Use Jukebox Software," Macworld Expo, San Francisco, Jan. 9, 2001.
"Apple's iPod Available in Stores Tomorrow," Press Release, Apple Computer, Inc., Nov. 9, 2001.
"Nomad Jukebox," User Guide, Creative Technology Ltd., Version 1, Aug. 2000.
"SoundJam MP Plus Manual, version 2.0" / MP3 Player and Encoder for Macintosh by Jeffrey Robbin, Bill Kincaid and Dave Heller, manual by Tom Negrino, published by Casady & Greene, Inc., 2000.
"12.1" 925 Candela Mobile PC", downloaded from LCDHardware.com on Dec. 19, 2002, http://www.lcdharware.com/panel/12_1_panel/default.asp.
"BL82 Series Backlit Keyboards", Dec. 19, 2002. www.tg3electronics.com/products/backlit/backlit.htm, downloaded Dec. 19, 2002.
"Bluetooth PC Headsets—Enjoy Wireless VoIP Conversations: 'Connecting' Your Bluetooth Headset With Your Computer", Bluetooth PC Headsets; downloaded on Apr. 29, 2006 from http://www.bluetoothpcheadsets.com/connect.htm.
"Creative MuVo TX 256 MB," T3 Magazine, Aug. 17, 2004, http://www.t3.co.uk/reviews/entertainment/mp3_player/creative_muvo_tx_256mb [downloaded Jun. 6, 2006].
"Digital Still Cameras—Downloading Images to a Computer," Mimi Chakarova et al., Multi/Media Reporting and Convergence, 2 pgs.
"Eluminx Illuminated Keyboard", downloaded Dec. 19, 2002, http://www.elumix.com/.
"How to Pair a Bluetooth Headset & Cell Phone", About.com; downloaded on Apr. 29, 2006 from http://mobileoffice.about.com/od/usingyourphone/ht/blueheadset_p.htm.
"Peripherals for Industrial Keyboards & Pointing Devices", Stealth Computer Corporation, downloaded on Dec. 19, 2002, http://www.stealthcomputer.com/peropherals_oem.htm.
"Poly/Optical Fiber Optic Membrane Switch Backlighting", downloaded Dec. 19, 2002, http://www.poly/optical.com/membrane_switches.html.
"Public Safety Technologies Tracer 2000 Computer", downloaded Dec. 19, 2002, http://www.pst911.com/traver.html.
"QuickTime Movie Playback Programming Guide", Apple Computer, Inc., Aug. 11, 2005.
"QuickTime Overview", Apple Computer, Inc., Aug. 11, 2005.
"Rocky Matrix Backlit Keyboard", downloaded Dec. 19, 2002, http://www.amrel.com/asi_matrixkeyboard.html.
"Sony Ericsson to introduce Auto pairing to improve Bluetooth connectivity between headsets and phones", Sep. 28, 2005 Press Release, Sony Ericsson Corporate; downloaded on Apr. 29, 2006 from http://www.sonyericsson.com/spg.jsp?cc=global&lc=en&ver=4001&template=pc3_1_1 &z...
"TAOS, Inc., Announces Industry's First Ambient Light Sensor to Convert Light Intensity to Digital Signals", www.taosinc.com/pressrelease_090902111m downloaded Jan. 23, 2003.

"Toughbook 28: Powerful, Rugged and Wireless", Panasonic: Toughbook Models, downloaded Dec. 19, 2002, http:www.panasonic.com/computer/notebook/html/01a_s8.htm.

"When it Comes to Selecting a Projection TV, Toshiba Makes Everything Perfectly Clear, Previews of New Releases", www.bestbuy.com/HomeAudioVideo/Specials/ToshibaTVFeatures.asp, downloaded Jan. 23, 2003.

"WhyBuy: Think Pad", IBM ThinkPad Web Page Ease of Use, downloaded on Dec. 19, 2002, http://www.pc.ibm.com/us/thinkpad/easeofuse.html.

512MB Waterproof MP3 Player with FM Radio & Built/in Pedometer, Oregon Scientific, downloaded on Jul. 31, 2006 from http://www2.oregonscientific.com/shop/product.asp?cid=4&scid=11&pid=581.

Adam C. Engst, "SoundJam Keeps on Jammin'," Jun. 19, 2000, http://db.tidbits.com/getbits.acgi?tbart=05988.

Alex Veiga, "AT&T Wireless Launching Music Service," Yahoo! Finance, Oct. 5, 2004, pp. 1/2.

Andrew Birrell, "Personal Jukebox (PJB)," Oct. 13, 2000, http://birrell.org/andrew/talks/pjb/overview.ppt.

Bociurkiw, Michael, "Product Guide: Vanessa Matz,", www.forbes.com/asap/2000/1127/vmartz_print.html, Nov. 27, 2000.

Compaq, "Personal Jukebox," Jan. 24, 2001, http://research.compaq.com/SRC/pjb/.

Creative: "Creative NOMAD MuVo TX," www.creative.com, Nov. 1, 2004, http://web.archive.org/web/20041024175952/www.creative.com/products/pfriendly.asp?product=9672 [downloaded Jun. 6, 2006].

Creative: "Creative NOMAD MuVo," www.creative.com, Nov. 1, 2004, http://web.archive.org/web/20041024075901/www.creative.com/products/product.asp?category=213&subcategory=215&product=110 [downloaded Jun. 7, 2006].

Creative: "MP3 Player," www.creative.com, Nov. 1, 2004, http://web.archive.org/web/20041024074823/www.creative.com/products/product.asp?category=213&subcategory=216&product=4983 [downloaded Jun. 7, 2006].

De Herrera, Chris, "Microsoft ActiveSync 3.1," Version 1.02, Oct. 13, 2000.

iAP Sports Lingo 0x09 Protocol V1.00, May 1, 2006.

IEEE 1394—Wikipedia, 1995 http://www.wikipedia.org/wiki/Firewire.

Written Opinion of the International Searching Authority dated Nov. 24, 2006 in PCT Application No. PCT/US2005/046797.

International Search Report dated Feb. 4, 2003 in corresponding application No. PCT/US2002/033330.

International Search Report dated Jul. 10, 2007 in corresponding application No. PCT/US2006/048738.

International Search Report dated Apr. 5, 2006 from corresponding International Application No. PCT/US2005/038819.

International Search Report dated Jun. 19, 2007 in related Application PCT/US2006/048753.

International Search Report dated May 21, 2007 from corresponding PCT Application No. PCT/US2006/048670.

International Search Report in corresponding European Application No. 06256215.2 dated Feb. 20, 2007.

Invitation to Pay Additional Fees and Partial Search Report for corresponding PCT Application No. PCT/US2005/046797 dated Jul. 3, 2006.

iTunes 2, Playlist Related Help Screens, iTunes v2.0, Apple Computer, Inc., Oct. 23, 2001.

iTunes, Playlist Related Help Screens, iTunes v1.0, Apple Computer, Inc., Jan. 2001.

Jabra Bluetooth Headset User Manual; GN Netcom A/s, 2005.

Jabra Bluetooth Introduction; GN Netcom A/S, Oct. 2004.

Jabra FreeSpeak BT200 User Manual; Jabra Corporation, 2002.

Kennedy, "Digital Data Storage Using Video Disc," IBM Technical Disclosure Bulletin, vol. 24, No. 2, Jul. 1981.

Miniman, "Applian Software's Replay Radio and Player v1.02," Product review, pocketnow.com, http://www.pocketnow.com/reviews/replay/replay.htm, Jul. 31, 2001.

Musicmatch, "Musicmatch and Xing Technology Introduce Musicmatch Jukebox," May 18, 1998, http://www.musicmatch.com/info/company/press/releases/?year=1998&release=2.

Nonhoff/Arps, et al., "Straβenmusik Portable MP3/Spieler mit USB/Anschluss," CT Magazin Fuer Computer Technik, Verlag Heinz Heise GMBH, Hannover DE, No. 25, Dec. 4, 2000.

International Search Report dated Nov. 24, 2006 in PCT Application No. PCT/US2005/046797.

Personal Jukebox (PJB), "Systems Research Center and PAAD," Compaq Computer Corp., Oct. 13, 2000, http://research.compaq.com/SRC/pjb/.

Peter Lewis, "Two New Ways to Buy Your Bits," CNN Money, Dec. 31, 2003, pp. 1/4.

Sastry, Ravindra Wadali. "A Need for Speed: A New Speedometer for Runners", submitted to the Department of Electrical Engineering and Computer Science at the Massachusetts Institute of Technology, May 28, 1999.

Sinitsyn, Alexander. "A Synchronization Framework for Personal Mobile Servers," Pervasice Computing and Communications Workshops, 2004. Proceedings of the Second IEEE Annual Conference on, Piscataway, NJ, USA, IEEE, Mar. 14, 2004, pp. 208/212.

SoundJam MP Plus, Representative Screens, published by Casady & Greene, Inc., Salinas, CA, 2000.

Specification Sheet, iTunes 2, Apple Computer, Inc., Oct. 31, 2001.

Spiller, Karen. "Low/decibel earbuds keep noise at a reasonable level", The Telegraph Online, dated Aug. 13, 2006, http://www.nashuatelegraph.com/apps/pbcs.dll/article?Date=20060813&Cate.. Downloaded Aug. 16, 2006.

Steinberg, "Sonicblue Rio Car," Product Review, Dec. 12, 2000, http://electronics.cnet.com/electronics/0/6342420/1304/4098389.html.

Travis Butler, "Archon Jukebox 6000 Challenges Nomad Jukebox," Aug. 13, 2001, http://db.tidbits.com/getbits.acgi?tbart=06521.

Travis Butler, "Portable MP3: The Nomad Jukebox," Jan. 8, 2001, http://db.tidbits.com/getbits.acgi?tbart=06261.

U.S. Appl. No. 11/621,541, "Personalized Podcasting Podmapping" filed Jan. 9, 2007.

Waterproof Music Player with FM Radio and Pedometer User Manual, Oregon Scientific, 2005.

Office Action dated May 11, 2009 in U.S. Appl. No. 11/680,580.

Notice of Allowance dated Apr. 21, 2009 in U.S. Appl. No. 11/327,544.

Office Action in European Patent Application No. 05 855 368.6 dated Nov. 20, 2008.

Office Action dated Dec. 15, 2008 in U.S. Appl. No. 11/212,313.

Notice of Allowance dated Dec. 18, 2008 in U.S. Appl. No. 11/212,555.

International Search Report dated Oct. 10, 2008 in PCT Application No. PCT/US2007/077160.

Written Opinion dated Oct. 10, 2008 in PCT Application No. PCT/US2007/077160.

Office Action dated Jan. 26, 2009 in U.S. Appl. No. 11/373,468.

Office Action dated Sep. 1, 2008 in EP Application No. 06 256 215.2.

Written Opinion dated Jan. 6, 2009 in Singapore Application No. 200701865-8.

Office Action dated Mar. 30, 2009 in U.S. Appl. No. 11/515,270.

Office Action dated May 27, 2009 in U.S. Appl. No. 11/439,613.

Office Action dated Jun. 2, 2009 in U.S. Appl. No. 11/530,773.

Office Action dated Dec. 14, 2009 in U.S. Appl. No. 11/535,646.

Notice of Allowance dated Jun. 15, 2009 in U.S. Appl. No. 11/212,313.

Office Action dated Jun. 22, 2009 in U.S. Appl. No. 11/515,270.

Office Action dated Jun. 24, 2009 in U.S. Appl. No. 11/519,352.

Office Action dated Sep. 10, 2009 in U.S. Appl. No. 11/746,548.

Office Action dated Sep. 2, 2009 in U.S. Appl. No. 11/515,270.

Office Action dated Oct. 23, 2009 in Chinese Application No. 200580048143.9.

Office Action dated Nov. 16, 2009 in U.S. Appl. No. 11/439,613.

Office Action dated Nov. 16, 2009 in U.S. Appl. No. 11/144,541.

Office Action dated May 29, 2009 in EP Application No. 06 847 856.9.

Office Action dated Dec. 11, 2009 in U.S. Appl. No. 11/519,352.

Office Action dated Dec. 16, 2009 in U.S. Appl. No. 11/746,548.

Examination Report dated Sep. 1, 2009 in Singapore Application No. 200701865-8.

Office Action dated Mar. 10, 2010 in U.S. Appl. No. 11/583,327.

Office Action dated Jun. 24, 2009 in U.S. Appl. No. 11/373,468.
Office Action dated Sep. 3, 2009 in U.S. Appl. No. 11/324,863.
Office Action dated Feb. 3, 2010 in U.S. Appl. No. 11/439,613.
Office Action dated Sep. 25, 2009 in Chinese Application No. 200610130904.1.
Notice of Allowance dated Feb. 4, 2010 in U.S. Appl. No. 11/535,646.
Office Action dated Mar. 9, 2010 in U.S. Appl. No. 11/519,352.
Office Action dated Mar. 25, 2010 in U.S. Appl. No. 11/297,032.
Office Action dated Mar. 11, 2010 in U.S. Appl. No. 11/830,746.
Office Action dated Mar. 4, 2010 in U.S. Appl. No. 11/324,863.
Office Action dated Apr. 12, 2010 in U.S. Appl. No. 12/397,051.
Office Action dated Apr. 13, 2010 in U.S. Appl. No. 12/406,793.
Office Action dated Apr. 15, 2010 in U.S. Appl. No. 11/373,468.

* cited by examiner

| MODE | FULL SONGS | SNIPPETS |
|---|---|---|
| NO SKIP | 7 | 0 |
| MEDIUM SKIP | 6 | 20 |
| HIGH SKIP | 5 | 40 |
| SCAN | 0 | 140 |

FIG. 4C

MEDIA DEVICE WITH INTELLIGENT CACHE UTILIZATION

CROSS-REFERENCE TO RELATED APPLICATION

This application claims priority benefit of U.S. Provisional Application No. 60/756,096, filed Jan. 3, 2006, and entitled "MEDIA DEVICE WITH INTELLIGENT CACHE UTILIZATION," which is hereby incorporated herein by reference.

BACKGROUND OF THE INVENTION

1. Field of the Invention

The present invention relates to media devices and, more particularly, to playing of media on media devices.

2. Description of the Related Art

Media players are becoming more popular these days. Of particular popularity are portable media players such as MP3 players or DVD players. Media players operate to play media items for their user that are stored within the media players. The media items are most commonly audio items (e.g., songs) but could also be video items (e.g., DVDs). Typically, an MP3 player will store various audio items internally on a storage disk. When the user makes a selection to play one of the stored audio items, the audio item must first be loaded into semiconductor memory (i.e., Random-Access Memory) before the audio item begins to be played. The delay in reading the rather large file for the audio item is unsatisfactory to users who are anxious to hear the audio item they have already selected to be played. Recently, advancements in MP3 players have enabled some MP3 players to begin playing an audio item before being completely loaded into semiconductor memory. See, for example, U.S. Pat. No. 6,799,226.

Whenever a media item to be played is not stored within the semiconductor memory, the storage disk must be accessed. Unfortunately, storage disks are rather costly in terms of power consumption for small, battery-powered MP3 players. Accordingly, there is a need for improved techniques to reduce the need to access the storage disks of media players.

SUMMARY OF THE INVENTION

Broadly speaking, the invention relates to a portable media device and a method for operating a portable media device. According to one aspect, a battery-powered portable media device can manage use of a mass storage device to efficiently utilize battery power. By providing a cache memory and loading the cache memory so as to provide skip support, battery power for the portable media device can be conserved (i.e., efficiently consumed). According to another aspect, a portable media device can operate efficiently in a seek mode. The seek mode is an operational mode of the portable media device in which the portable media device automatically scans through media items to assist a user in selecting a desired one of the media items.

The invention can be implemented in numerous ways, including as a method, system, device, apparatus, or computer readable medium. Several embodiments of the invention are discussed below.

As a method for operating a media device having a cache memory as well as a disk drive for storage of media data for media items, one embodiment of the invention includes at least the operations of: receiving a selection of a particular media item to be presented by the media device, the particular media item being one of a plurality of media items organized in a sequential list; loading, in response to the selection, at least a portion of the media data for the particular media item retrieved from the disk storage to the cache memory; loading, in response to the selection, initial portions of media data for a plurality of sequentially adjacent media items from the sequential list with respect to the particular media item; and thereafter loading remaining portions of media data for a subset of the plurality of the sequentially adjacent media items from the sequential list.

As a method for operating a media device having a cache memory as well as a disk drive for storage of media data for media items, another embodiment of the invention includes at least the operations of: receiving a selection of a particular media item to be presented by the media device, the particular media item being one of a plurality of media items organized in a sequential list; loading, in response to the selection, at least a portion of the media data for the particular media item retrieved from the disk storage to the cache memory; loading, in response to the selection, complete media data for a plurality of sequentially adjacent media items from the sequential list with respect to the particular media item; and loading, in response to the selection, only initial media data for a plurality of other sequentially adjacent media items from the sequential list.

As a method for operating a media device having a first memory as well as a mass storage device for storage of media data for media items, one embodiment of the invention includes at least the operations of: receiving a user play selection for a selected media item from the media items; determining an amount or degree of skip support to be provided by the media device; determining media data to be stored in the first memory based on the user play selection and the amount or degree of skip support; and loading the determined media data into the first memory from the mass storage device.

As a method for operating a media device having a cache memory as well as a disk drive for storage of media data for media items, yet another embodiment of the invention includes at least the operations of: receiving a user play selection for a selected media item from the media items; determining whether media data for the selected media item is contained in the cache memory; when it is determined that the media data for the selected media item is not contained in the cache memory, determining a media data set to be stored in the cache memory, and loading the media data set into the cache memory; retrieving the media data for the selected media item from the cache memory; initiating playing of the retrieved media data; receiving a user skip selection for another media item from the media items; determining whether media data for the another media item is contained in the cache memory; when it is determined that the media data for the another media item is not contained in the cache memory, determining another media data set to be stored in the cache memory, and loading the another media data set into the cache memory; retrieving the media data for the another media item from the cache memory; and initiating playing of the retrieved media data.

As a computer readable medium including at least computer program code for operating a media device having a first memory as well as a mass storage device for storage of media data for media items, one embodiment of the invention includes at least: computer program code for receiving a user play selection for a selected media item from the media items; computer program code for determining an amount or degree of skip support to be provided by the media device; computer program code for determining media data to be stored in the first memory based on the user play selection and the amount or degree of skip support; and computer program code for loading the determined media data into the first memory from the mass storage device.

As a consumer electronics product, one embodiment of the invention includes at least: a storage disk that stores a plurality of media items; a user input device that enables a user of the consumer electronics product to at least select a particular media item from the plurality of media items; a cache memory capable of storing at least one of the media items; and a processor operatively connected to the storage disk, the user input device and the cache memory. The processor causes the cache memory to support a series of skip selections by the user via the user input device. In supporting the skip selection, the processor causes the cache memory to, in advance of the skip selections, store only initial portions of a plurality of media items other than the particular media item that correspond to the skip selections.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 4C is a diagram of an exemplary table according to one embodiment of the invention.

DETAILED DESCRIPTION OF THE INVENTION

The invention relates to a portable media device and a method for operating the portable media device. According to one aspect, a battery-powered portable media device can manage use of a mass storage device to efficiently utilize battery power. By providing a cache memory and loading the cache memory so as to provide skip support, battery power for the portable media device can be conserved (i.e., efficiently consumed). According to another aspect, a portable media device can operate efficiently in a seek mode. The seek mode is an operational mode of the portable media device in which the portable media device automatically scans through media items to assist a user in selecting a desired one of the media items.

Embodiments of this aspect of the invention are discussed below with reference to FIGS. 1-10. However, those skilled in the art will readily appreciate that the detailed description given herein with respect to these figures is for explanatory purposes as the invention extends beyond these limited embodiments.

According to one aspect, a portable media device can manage use of a mass storage device to efficiently utilize battery power. By providing a cache memory and loading the cache memory so as to provide skip support, battery power for the portable media device can be conserved, such as during successive skip operations.

Figure 1:
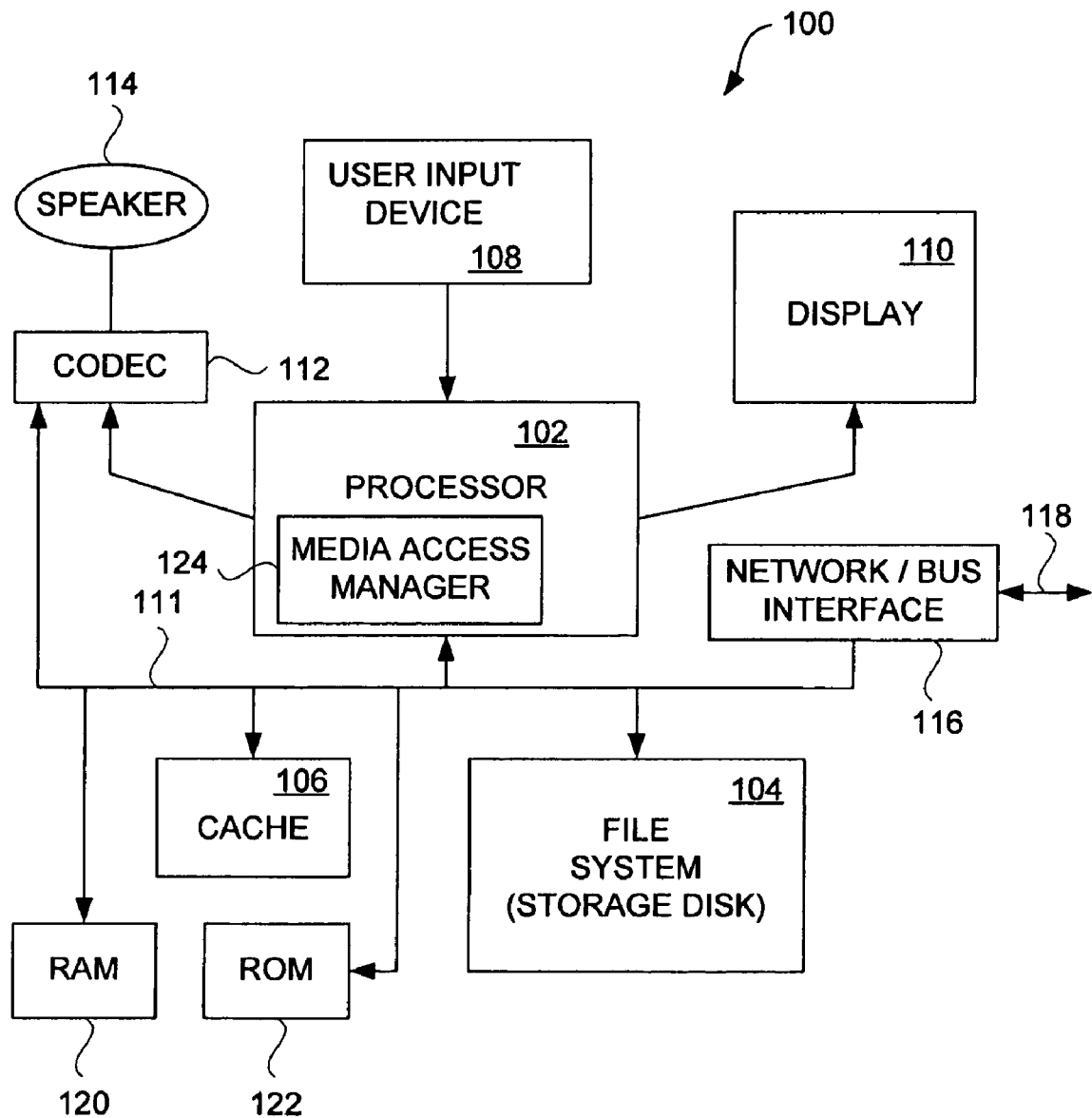
FIG. 1 is a block diagram of a media player according to one embodiment of the invention.

FIG. 1 is a block diagram of a media player 100 according to one embodiment of the invention. The media player 100 includes a processor 102 that pertains to a microprocessor or controller for controlling the overall operation of the media player 100. The media player 100 stores media data pertaining to media items in a file system 104. The file system 104 is, typically, a mass storage device, such as a storage disk or a plurality of disks. The file system 104 typically provides high capacity storage capability for the media player 100. The file system 104 can store not only media data but also non-media data (e.g., when operated in a disk mode). However, since the access time to the file system 104 is relatively slow, the media player 100 can also include a cache 106 (cache memory). The cache 106 is, for example, Random-Access Memory (RAM) provided by semiconductor memory. The relative access time to the cache 106 is substantially shorter than for the file system 104. However, the cache 106 does not have the large storage capacity of the file system 104. Further, the file system 104, when active, consumes substantially more power than does the cache 106. Since the media player 100 is normally a portable media player that is powered by a battery (not shown), power consumption is a general concern.

The media player 100 also includes a RAM 120 and a Read-Only Memory (ROM) 122. The ROM 122 can store programs, utilities or processes to be executed in a non-volatile manner. The ROM 122 can be implemented such that it is re-programmable, e.g., using EEPROM or FLASH technologies. The RAM 120 provides volatile data storage, such as for the cache 106.

The media player 100 also includes a user input device 108 that allows a user of the media player 100 to interact with the media player 100. For example, the user input device 108 can take a variety of forms, such as a button, keypad, dial, etc. Still further, the media player 100 includes a display 110 (screen display) that can be controlled by the processor 102 to display information to the user. A data bus 111 can facilitate data transfer between at least the file system 104, the cache 106, the processor 102, and the CODEC 112.

In one embodiment, the media player 100 serves to store a plurality of media items (e.g., songs) in the file system 104. When a user desires to have the media player 100 play a particular media item, a list of available media items can be displayed on the display 110. Then, using the user input device 108, a user can select one of the available media items. The processor 102, upon receiving a selection of a particular media item, the media data (e.g., audio file) for the particular media item is access by the processor 102 and then supplied to a coder/decoder (CODEC) 112. The CODEC 112 then produces analog output signals for a speaker 114. The speaker 114 can be a speaker internal to the media player 100 or external to the media player 100. For example, headphones or earphones that connect to the media player 100 would be considered an external speaker.

The media player 100 also includes a network/bus interface 116 that couples to a data link 118. The data link 118 allows the media player 100 to couple to a host computer. The data link 118 can be provided over a wired connection or a wireless connection. In the case of a wireless connection, the network/bus interface 116 can include a wireless transceiver.

Moreover, the processor 102 includes a media access manager 124. The media access manager 124 manages access to the plurality of media items via the file system 104 or the cache 106. More specifically, among other things, the media access manager 124 determines the appropriate media data to be stored in the cache 106. For example, based on user selection, user behavior or predetermined criteria, the media access manager 124 determines the appropriate media data to be stored in the cache 106. When the appropriate media data resides in the cache 106, the file system 104 can be inactive (e.g., "powered-off"). Since the cache 106 consumes substantially less power than the file system 104, the media player 100 can be operated in a power efficient manner.

Although the display 110 can be used to display a graphical user interface for a user, the display 110 is not required for the media player 100.

Figure 2:
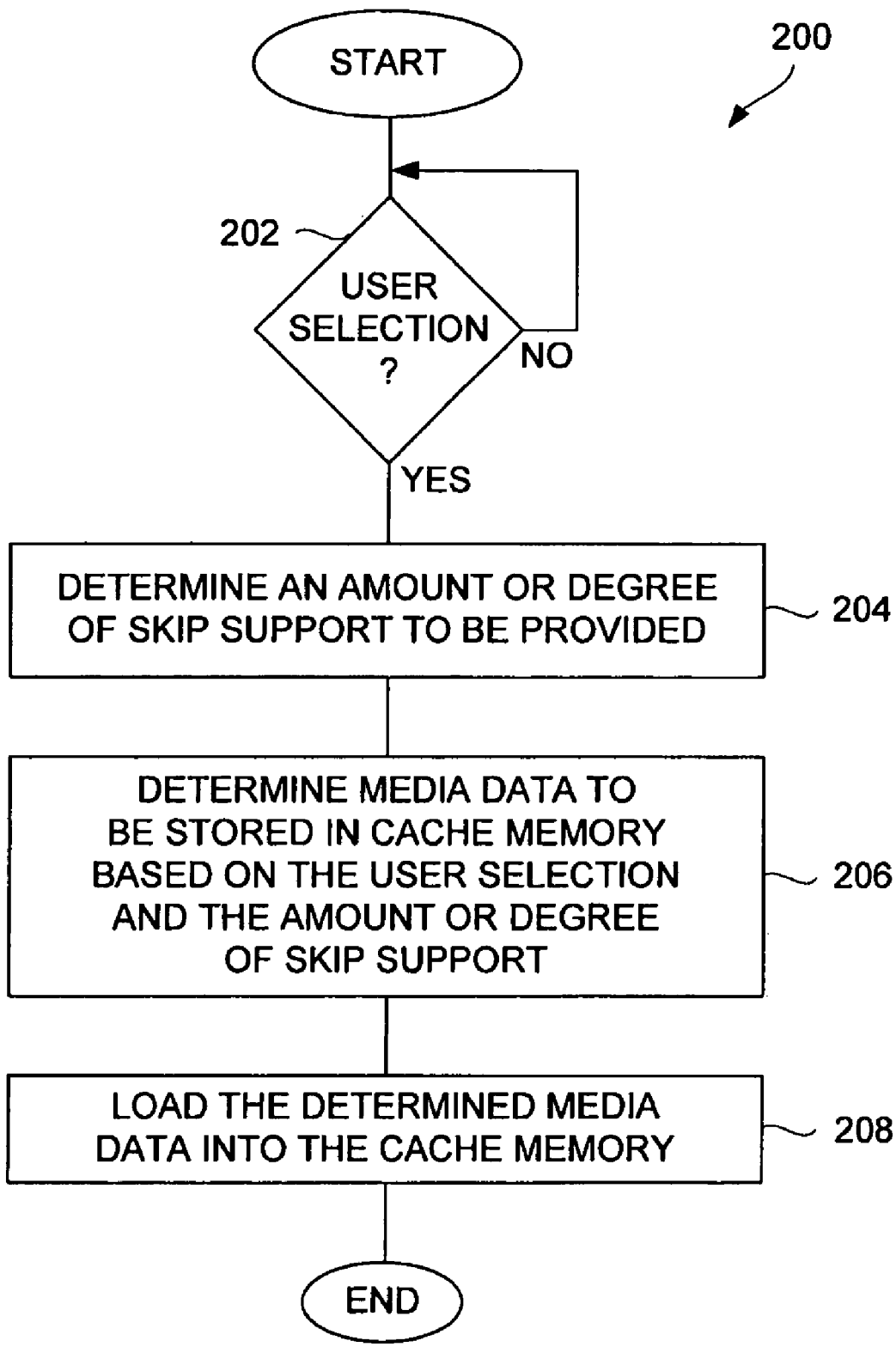
FIG. 2 is a flow diagram of a cache loading process according to one embodiment of the invention.

FIG. 2 is a flow diagram of a cache loading process 200 according to one embodiment of the invention. The cache loading process 200 is performed by a media device. More particularly, the cache loading process 200 is, for example, performed by a media access manager, such as the media access manager 124 illustrated in FIG. 1, in the context of loading a cache memory, such as the cache 106 illustrated in FIG. 1.

The cache loading process 200 begins with a decision 202 that determines whether a user selection has been made. Typically, as discussed in detail below, the user can be presented with a list or menu of media items that can be selected. For example, the selection of a media item by the user can signal the media device that the user desires to have the media item presented. For example, the media device can present a media item by playing the media item or displaying the media item. When the decision 202 determines that a user selection has not been received, the cache loading process 200 awaits such a selection.

Once the cache loading process 200 determines that a user selection has been received, the cache loading process 200 continues. In other words, the cache loading process 200 is effectively invoked once a user selection has been received. In any case, following receipt of the user selection, an amount or degree of skip support to be provided is determined 204. The media device performing the cache loading process 200 serves to present media items to its user. However, the user may desire to navigate from one media item to another so as to control which of the media items is presented by the media player. The navigation from a current media item to a next media item is referred to as a skip operation in which the balance of the current media items is skipped and the next media item is presented. Skip support refers to memory resource utilization of the media device so as to facilitate efficient processing of skip operations.

The determination 206 of the amount or degree of skip support to be provided can be done in various different ways depending upon implementation. In one implementation, the amount or degree of skip support can be predetermined, such as by a designer or manufacturer of the media device. In another implementation, the amount or degree of skip support can be controlled or influenced by a user setting, such as a preference setting for the media device. In still another implementation, the amount or degree of skip support can be adapted (i.e., automatically) to user behavior, such as through use of a user history.

After the amount or degree of skip support has been determined 204, media data to be stored in a cache memory of the media device is determined 206. The determination 206 of the media data to be stored in the cache memory is based on the user selection and the amount or degree of skip support. The media data corresponds to a plurality of different media items. The amount or quantity of media data stored in a cache memory for each of the media items can be different. The media data for the plurality of media items to be stored in the cache memory can also be referred to as a media data set.

After the determined media data to be stored in the cache memory has been determined 206, the determined media data is loaded 208 into the cache memory. Here, the determined media data is typically retrieved from a disk drive of the media device and stored in the cache memory of the media device. After the determined media data has been loaded 208 into the cache memory, the cache loading process 200 ends. However, typically, once the determined media data is loaded into the cache memory, the selected media item can be presented by the media device using the media data that has been loaded into the cache memory. Also, should the user skip to one or more next adjacent media items, the required media data for such adjacent media items would at least partially be available in the cache memory. As a result, the media device can process a skip operation in an efficient manner. For example, the media device in many cases will not need to access the disk device (instead just the cache memory) to process the skip operation, thereby operating in a power efficient manner to conserve battery power. Also, having the needed media data already in the cache memory to process a skip operation, allows the media device to respond more quickly to a skip request from the user.

Figure 3:
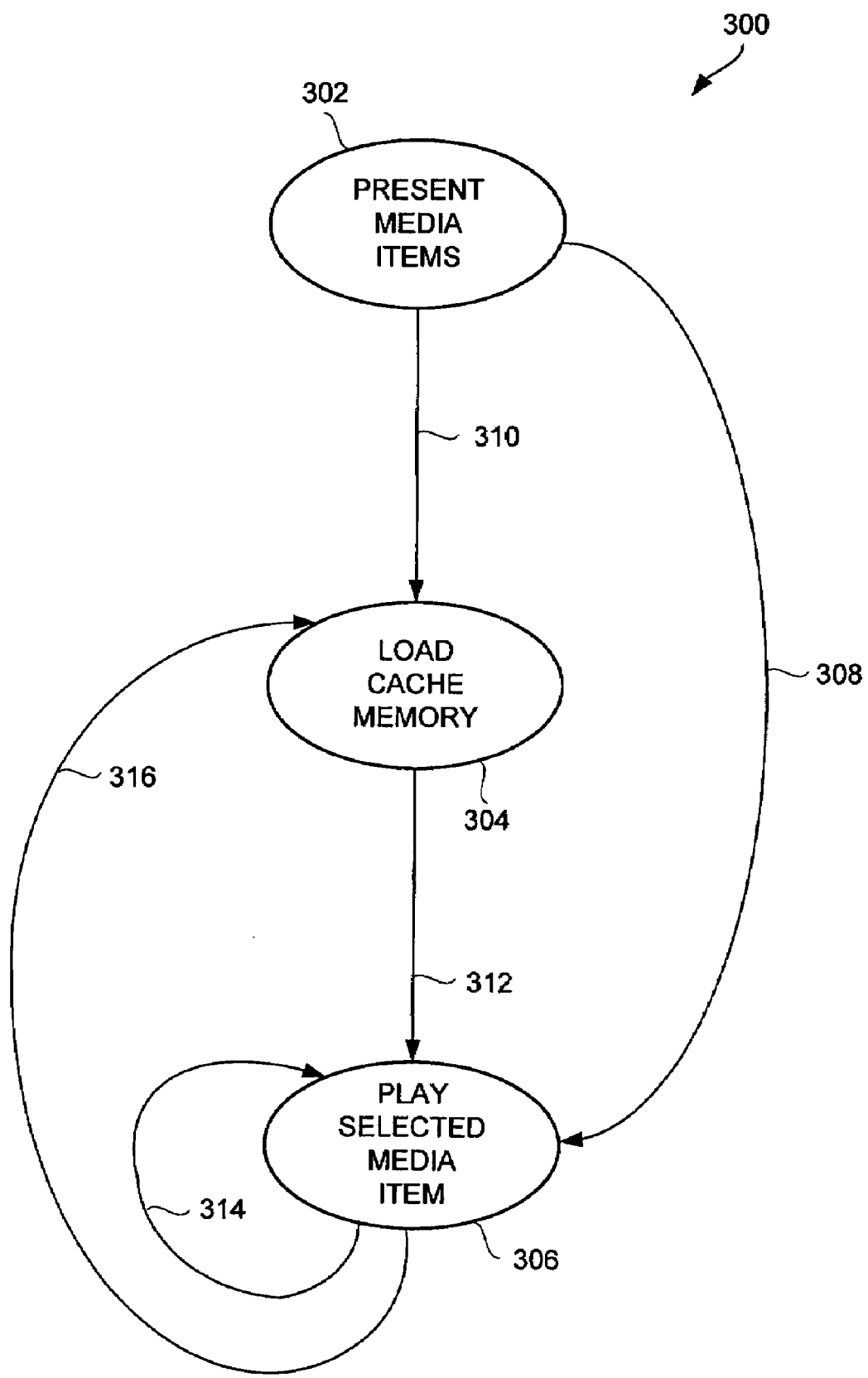
FIG. 3 is a state diagram according to one embodiment of the invention.

FIG. 3 is a state diagram 300 according to one embodiment of the invention. The state diagram 300 can represent three general operational states of a media device according to one embodiment of the invention. In particular, the state diagram 300 has initial state 302 where media items are presented. From the initial state 302, transitions to states 304 and 306 can be determined. Namely, from the initial state 302, upon receiving a user selection, the media device causes a transition 308 to the state 306 when the media data for a selected media item resides in the cache memory. At the state 306, the selected media item can be played. On the other hand, the user selection causes a transition 310 to the state 304 when the media data for the selected media item does not reside in the cache memory. Hence, at state 304, the cache memory is loaded. Following the completion of the state 304, the state machine 300 transitions 312 to the state 306 where the selected media item is played. While playing the selected media item at the state 306, a user may provide a skip request. In one instance, the skip request provides a transition 314 to the next media item, which in this case is already (at least its initial portion) present in the cache memory. As such, the next media items can be efficiently played using the media data present in the cache memory. On the other hand, when a skip request is made, and the media data for the next media item is not present in the cache memory, the state diagram 300 transitions 316 to the state 304 so that the cache memory can be loaded with the appropriate media data. Here, the disk drive or other mass storage device is activated to retrieve the appropriate media data for the cache memory. In one embodiment, some or all of the media data can be provided for purposes of skip support whereby only initial portions of certain media items are stored in the cache memory. Accordingly, by intelligently loading the cache memory, the state machine 300 provides the ability to process skip requests so that the transition 314 is utilized instead of the transition 316. The advantage of the transition 314 is that access to the disk drive is not necessary in order to reload the cache memory. As a result, power consumption by the media device is better managed so that battery life is lengthened.

Figure 4A:
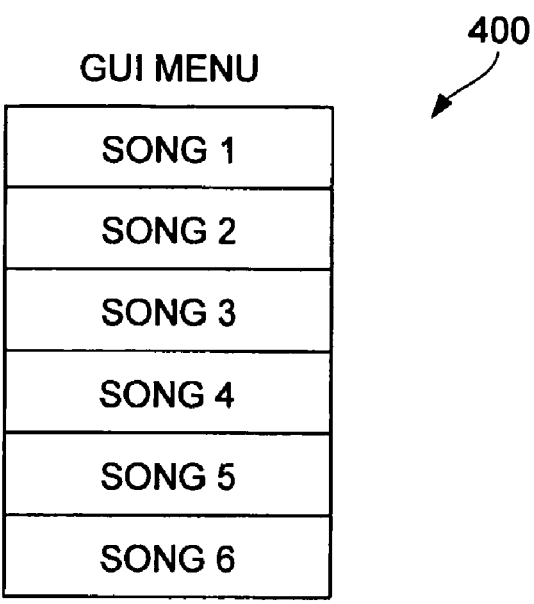
FIG. 4A illustrates a graphical user interface menu according to one embodiment of the invention.

FIG. 4A illustrates a graphical user interface menu 400 according to one embodiment of the invention. When the media device includes a display, a graphical user interface can be presented on the display. The graphical user interface menu 400 illustrated in FIG. 4A is an example of a basic menu (or list) that can be displayed on a display of a media device. The basic menu (or list) is normally an organized list or a sequential list. The media items within the basic menu (or list) can be songs (i.e., audio tracks) from one playlist or a plurality of playlists. The graphical user interface menu 400 depicts an organized list of six different songs. In this example, the media items are songs (i.e., audio tracks) that can be played by the media device. Using the graphical user interface menu 400, the user can interact with the media device to select one of the songs from those within the graphical user interface menu 400 to be played.

Figure 4B:
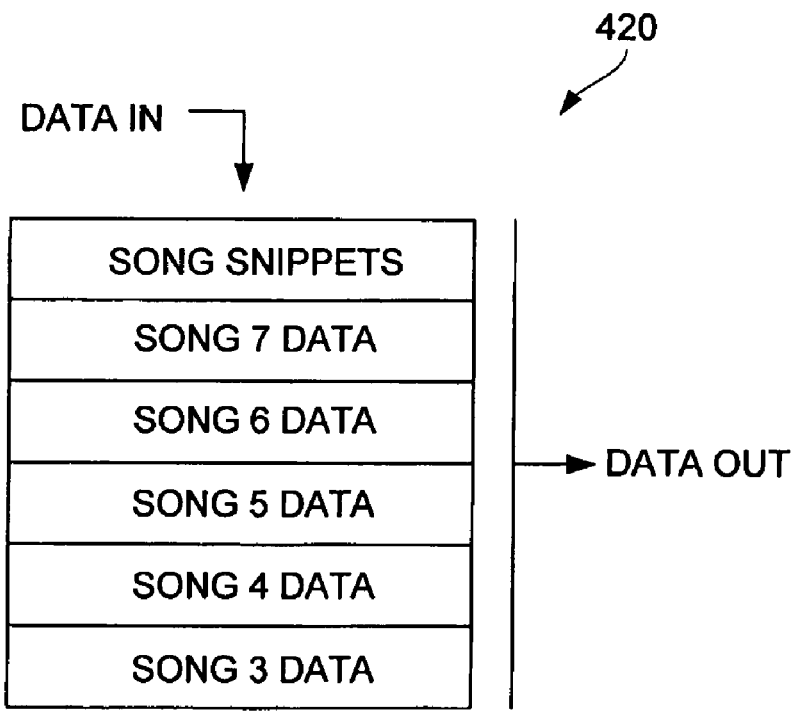
FIG. 4B is a diagram of a cache memory according to one embodiment of the invention.

FIG. 4B is a diagram of a cache memory 420 according to one embodiment of the invention. The cache memory 420 is shown loaded with media data corresponding to a plurality of media items. In particular, the cache memory 420 includes complete media data for songs 3 through 7 as well as snippet data for a plurality of other media items. For example, the snippet data can pertain to songs 8 through 48. In one implementation, a snippet corresponds to an initial portion of media data for a media item. The data stored in the cache memory 420 is typically sequential, whereas data can be randomly accessed found from the cache memory 420.

FIG. 4C is a diagram of an exemplary table 440 according to one embodiment of the invention. The table 440 categorizes different modes of operations for a media device. In this embodiment, the media items are audio tracks, namely, songs. In particular, the first column of the table 440 pertains to modes 442, the second column pertains to full songs 444, and the third column pertains to a number of snippets 446. The modes 442 are different skip modes, including: No Skip, Medium Skip, High Skip and Scan. For example, in the No Skip mode, the cache memory is loaded with seven (7) full songs and no snippets. In the Medium Skip mode, the cache memory is loaded with six (6) full songs and twenty (20) snippets. In the High Skip mode, the cache memory is loaded with five (5) full songs and forty (40) snippets. In the Scan mode, the cache memory is loaded with no full songs and one hundred and forty (140) snippets. The data within the table 440 is merely representative; hence, it should be understood that the different modes and the corresponding number of songs or snippets can vary substantially depending upon implementation. However, the general trend provided in this exemplary table 440 indicates that in certain modes more skip support is provided so as to better manage power consumption for improved battery life as well as to provide better user responsiveness. In general, the cache memory provides skip support by reserving a portion of its storage capacity for snippets. The larger the reserved portion for skip support (i.e., snippet storage), the more snippets that can be stored in the cache memory.

Figure 5:
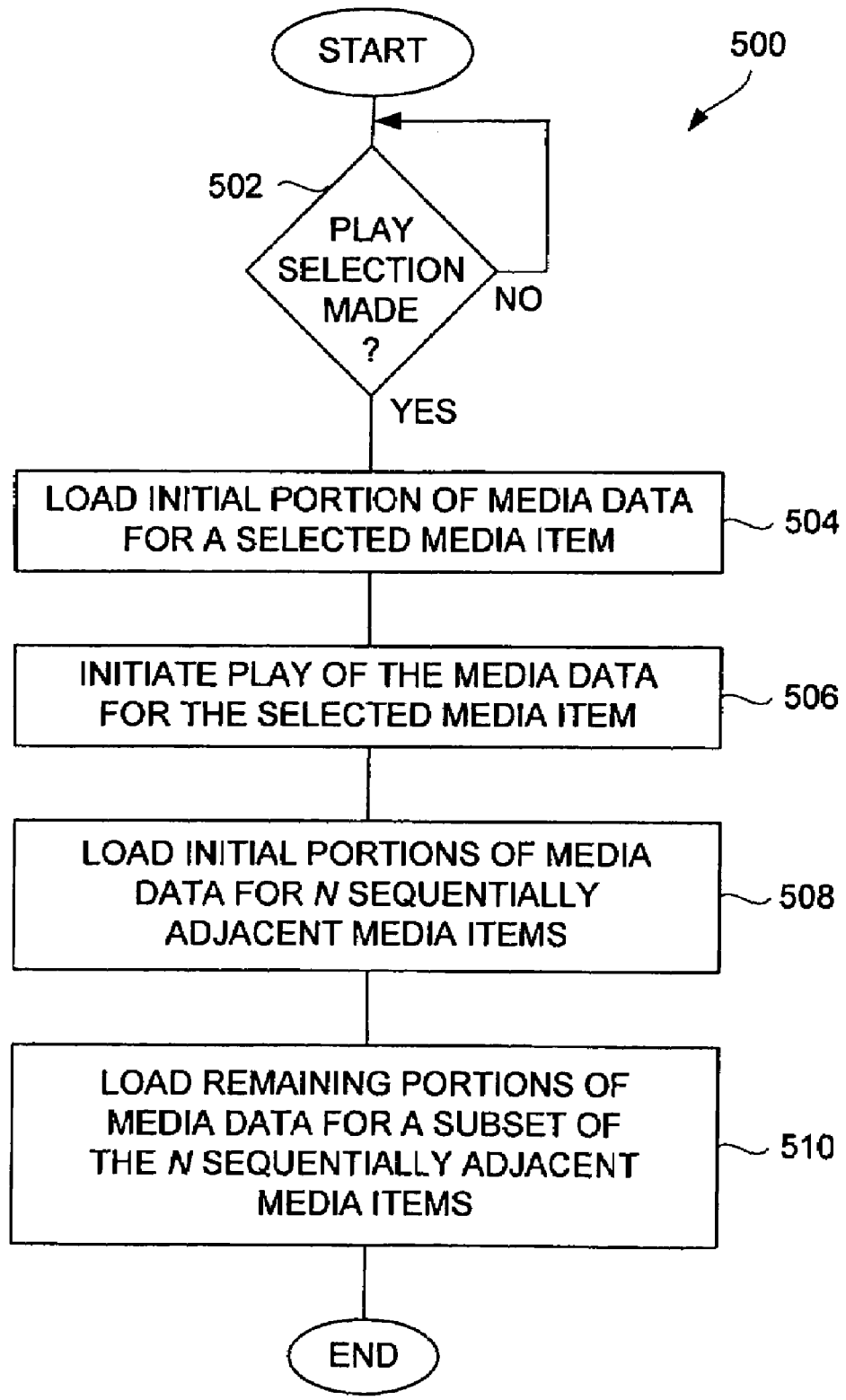
FIG. 5 is a flow diagram of a cache loading process according to another embodiment of the invention.

FIG. 5 is a flow diagram of a cache loading process 500 according to another embodiment of the invention. The cache loading process 500 is performed by a media device. More particularly, the cache loading process 500 is, for example, performed by a media access manager, such as the media access manager 124 illustrated in FIG. 1, in the context of loading a cache memory, such as the cache 106 illustrated in FIG. 1.

The media device performing the cache loading process 500 includes a cache memory and a disk drive. The disk drive maintains storage for media data for a plurality of media items. The cache memory stores a small subset of the media data stored in the disk drive. The cache memory offers fast, low power access to the media data. The cache loading process 500 serves to intelligently load a portion of the media data from the disk drive into the cache memory.

The cache loading process 500 begins with a decision 502 that determines whether a play selection has been made. When the decision 502 determines that a play selection has not yet been made, the cache loading process 500 awaits such a selection. Once the decision 502 determines that a play selection has been made, the cache loading process 500 continues. In other words, the cache loading process 500 can be deemed to be invoked once a play selection has been made.

After the decision 502 determines that a play selection has been made, an initial portion of media data for the selected media item is loaded 504 into the cache memory. Once the initial portion of the media data for the selected media item has been loaded 504 into the cache memory (or otherwise available), play of the media data for the selected media item can be initiated 506. In addition, initial portions of media data for N sequentially adjacent media items can be loaded 508 into the cache memory. Moreover, remaining portions of media data for a subset of the N sequentially adjacent media items can also be loaded 510 into the cache memory. After the operation 510, the cache loading process 500 ends. It should be noted that the order of the operations 504 through 510 can be performed in any order.

Figure 6:
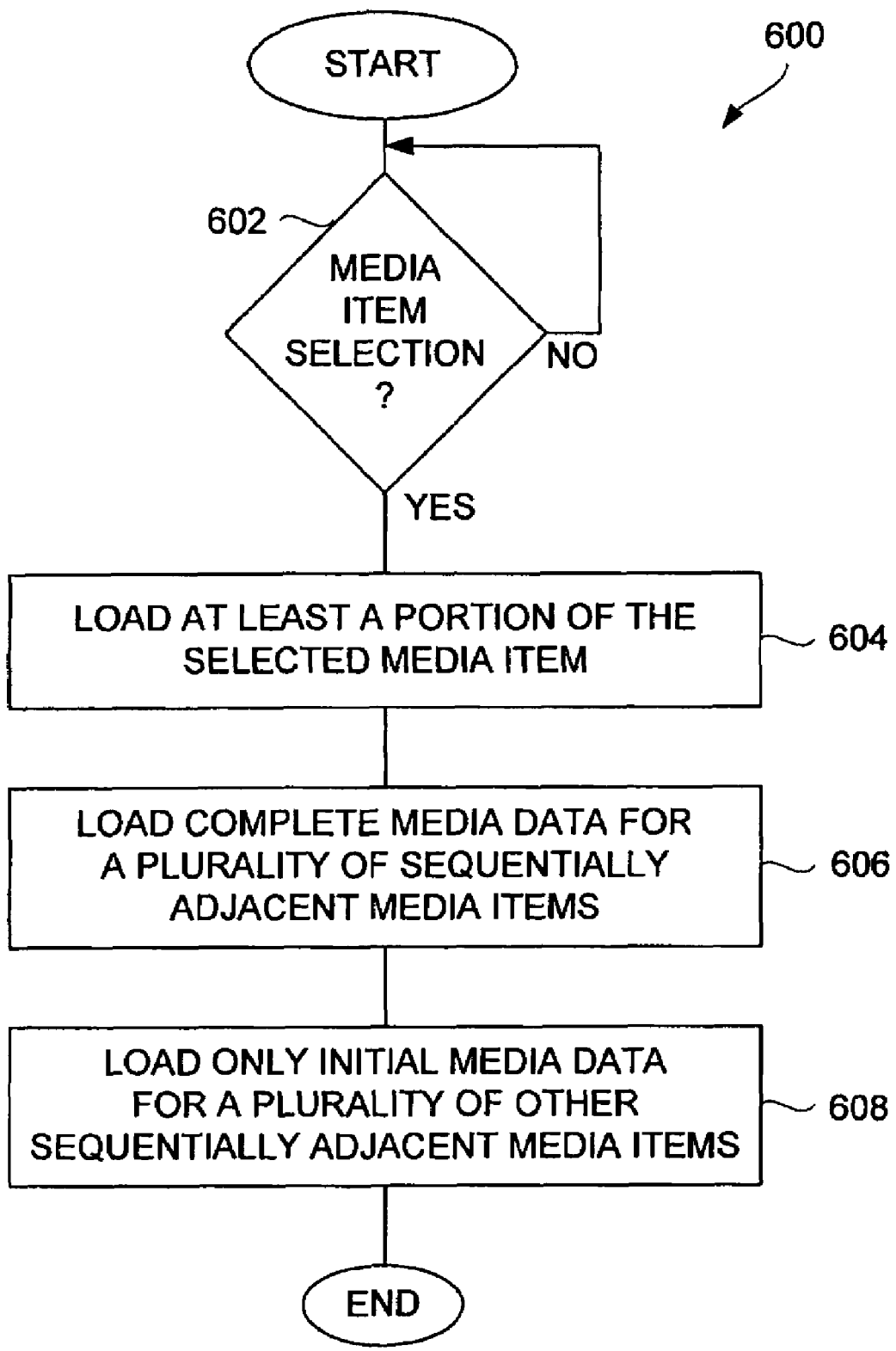
FIG. 6 is a flow diagram of a cache loading process according to another embodiment of the invention.

FIG. 6 is a flow diagram of a cache loading process 600 according to another embodiment of the invention. The cache loading process 600 is performed by a media device. More particularly, the cache loading process 600 is, for example, performed by a media access manager, such as the media access manager 124 illustrated in FIG. 1, in the context of loading a cache memory, such as the cache 106 illustrated in FIG. 1.

The media device performing the cache loading process 600 includes a cache memory and a disk drive. The disk drive maintains storage for media data for a plurality of media items. The cache memory stores a small subset of the media data stored in the disk drive. The cache memory offers fast, low power access to the media data. The cache loading process 600 serves to intelligently load a portion of the media data from the disk drive into the cache memory.

The cache loading process 600 begins with a decision 602 that determines whether a media item has been selected. When the decision 602 determines that a media item has not been selected, the cache loading process 600 awaits such a selection. Once the decision 602 determines that a media item selection has been made, at least a portion of the selected media item is loaded 604 into the cache memory. In addition, complete media data for a plurality of sequentially adjacent media items is also loaded 606 into the cache memory. Here, the sequentially adjacent media items are determined with respect to the selected media item. Typically, the sequentially adjacent media items are subsequent to the selected media and in a sequential list. Furthermore, initial media data for a plurality of other sequentially adjacent media items is loaded 608 into the cache memory. Here, it is only the initial media data for the plurality of other sequentially adjacent media items that is loaded 608 into the cache memory. These initial media data portions are utilized to support playing initial portions of media items during successive skip operations. Following the operation 608, the cache loading process 600 ends. It should be noted that the order of the operations 604 through 608 can be performed in any order.

Figure 7A:
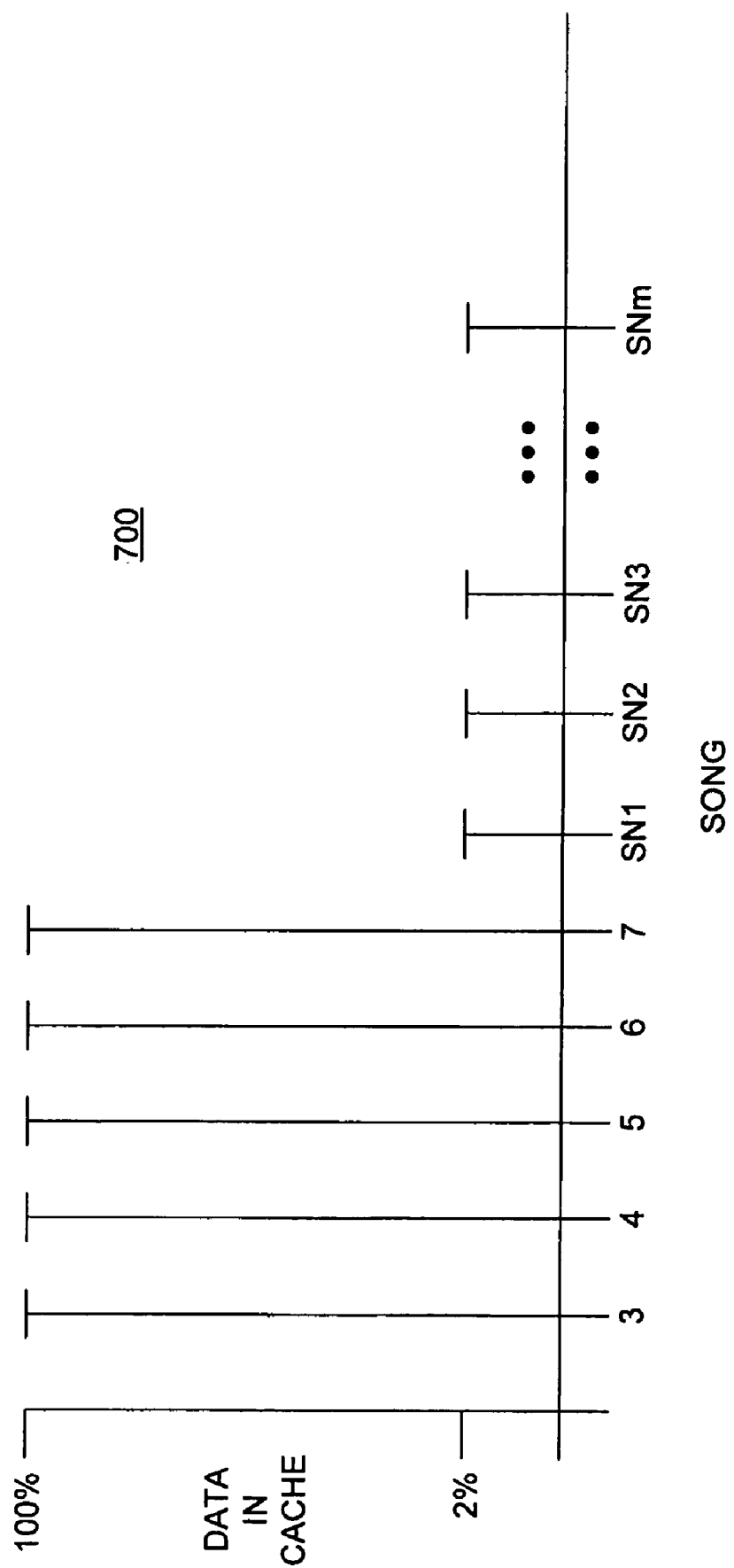
FIG. 7A illustrates a representative graph pertaining to data storage in a cache memory according to one embodiment of the invention.

FIG. 7A illustrates a representative graph 700 pertaining to data storage in a cache memory according to one embodiment of the invention. The representative graph 700 depicts percentage of data in a cache memory along the vertical axis and particular songs along the horizontal axis. The representative graph 700 depicts a media data set stored in a cache memory. In this example, songs 3 through 7 are fully stored within the cache memory, wherein as subsequent songs, denoted snippets SN1 through SNm, are only partially stored (e.g., 2%) in the cache memory. Here, a total of m snippets are stored in the cache memory. These snippets support skip operations as discussed elsewhere herein.

Although snippets represent only small portions of the complete media data for corresponding media items, it should be understood that the size of the snippets can vary with implementation. Still further, the size of the snippets can be controlled or adaptable. For example, a user selection (e.g., user preference) could influence the size of the snippets. As another example, the size of the snippets can also adapt to user behavior. As an example, if the user of the media device tends to enter a skip request very quickly, if at all, then the size of the skip requests could be made smaller than normal. Alternatively, if the user of the media device tends to enter a skip request very slowly, if at all, then the size of the skip requests could be made larger than normal.

Figure 7B:
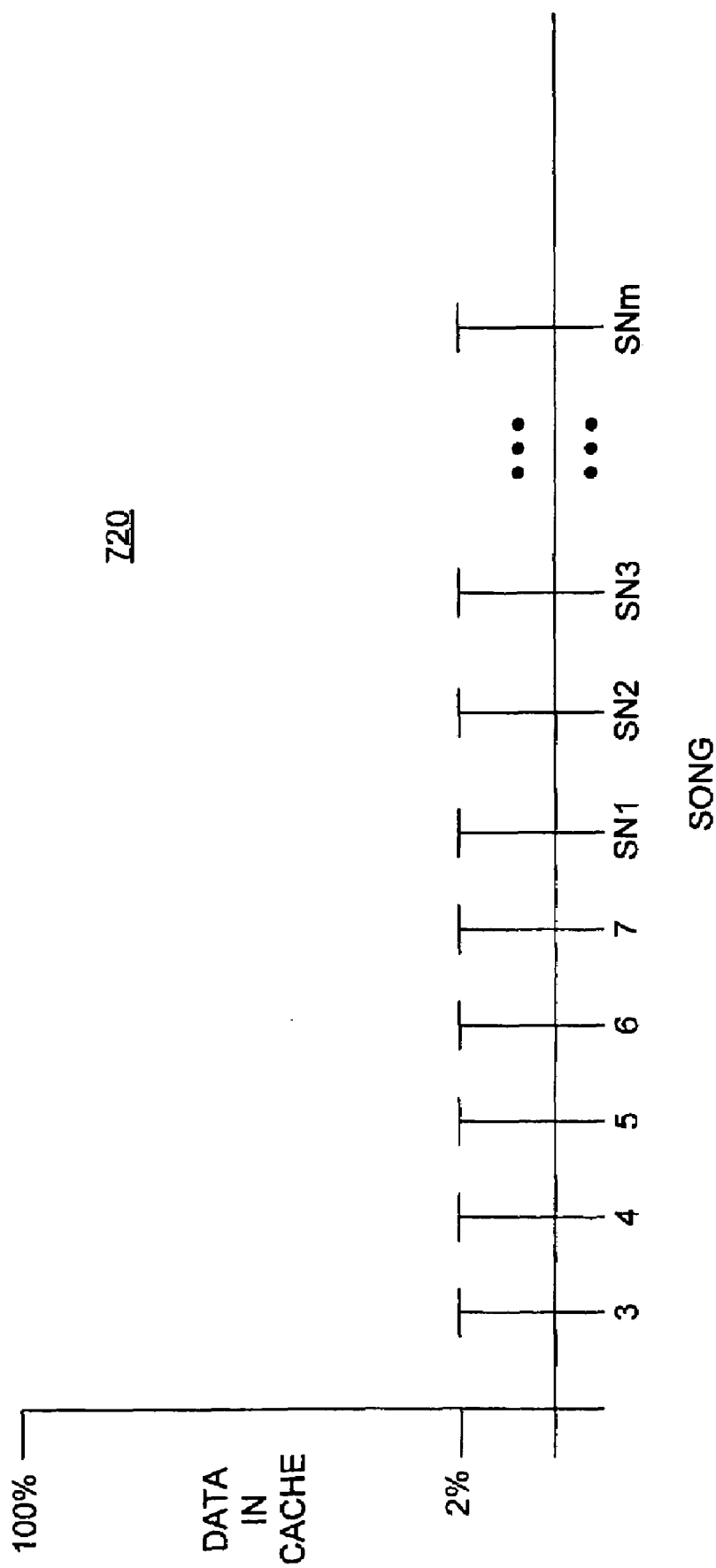
FIG. 7B illustrates a representative graph pertaining to data storage in a cache memory according to another embodiment of the invention.

FIG. 7B illustrates a representative graph 720 pertaining to data storage in a cache memory according to another embodiment of the invention. More particularly, the representative chart 720 can reflect a first phase of media data storage to the cache memory, wherein the identified songs to be stored in the cache memory each have their initial portions stored in the cache memory. After the first stage of media data storage is complete, the final stage of media data storage can be performed to result in the cache memory storing media data as illustrated in the representative graph 720 illustrated in FIG. 7A.

Figure 7C:
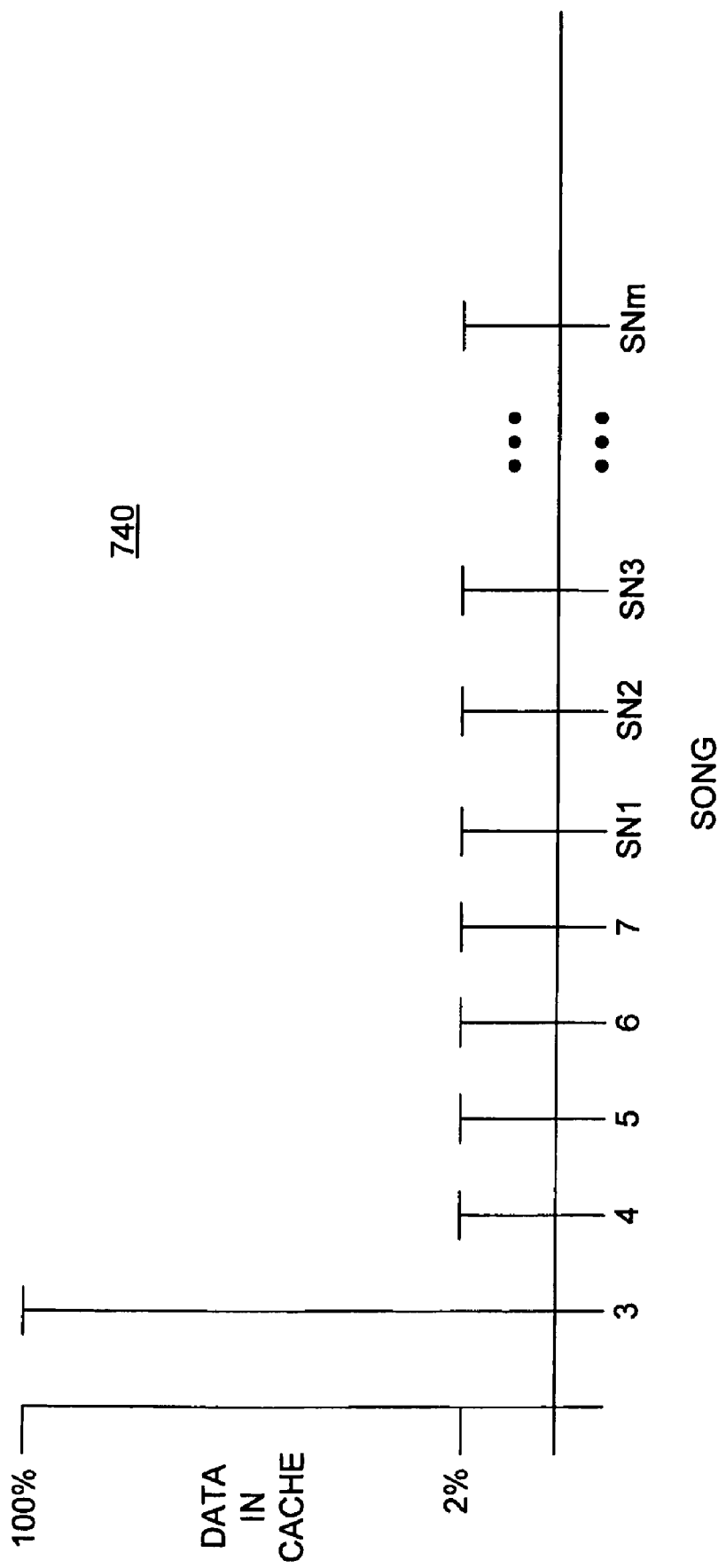
FIG. 7C illustrates a representative graph pertaining to data storage in a cache memory according to still another embodiment of the invention.

FIG. 7C illustrates a representative graph 740 pertaining to data storage in a cache memory according to still another embodiment of the invention. In this embodiment, a first phase of media data storage to the cache memory stores the complete media data for the selected media item, namely, song 3, whereas the remaining songs to be stored in the cache memory only have their initial portions stored in the cache memory at this time. After the first stage of media data storage is complete, the final stage of media data storage can be performed to result in the cache memory storing media data as illustrated in the representative graph 720 illustrated in FIG. 7A.

Figure 8:
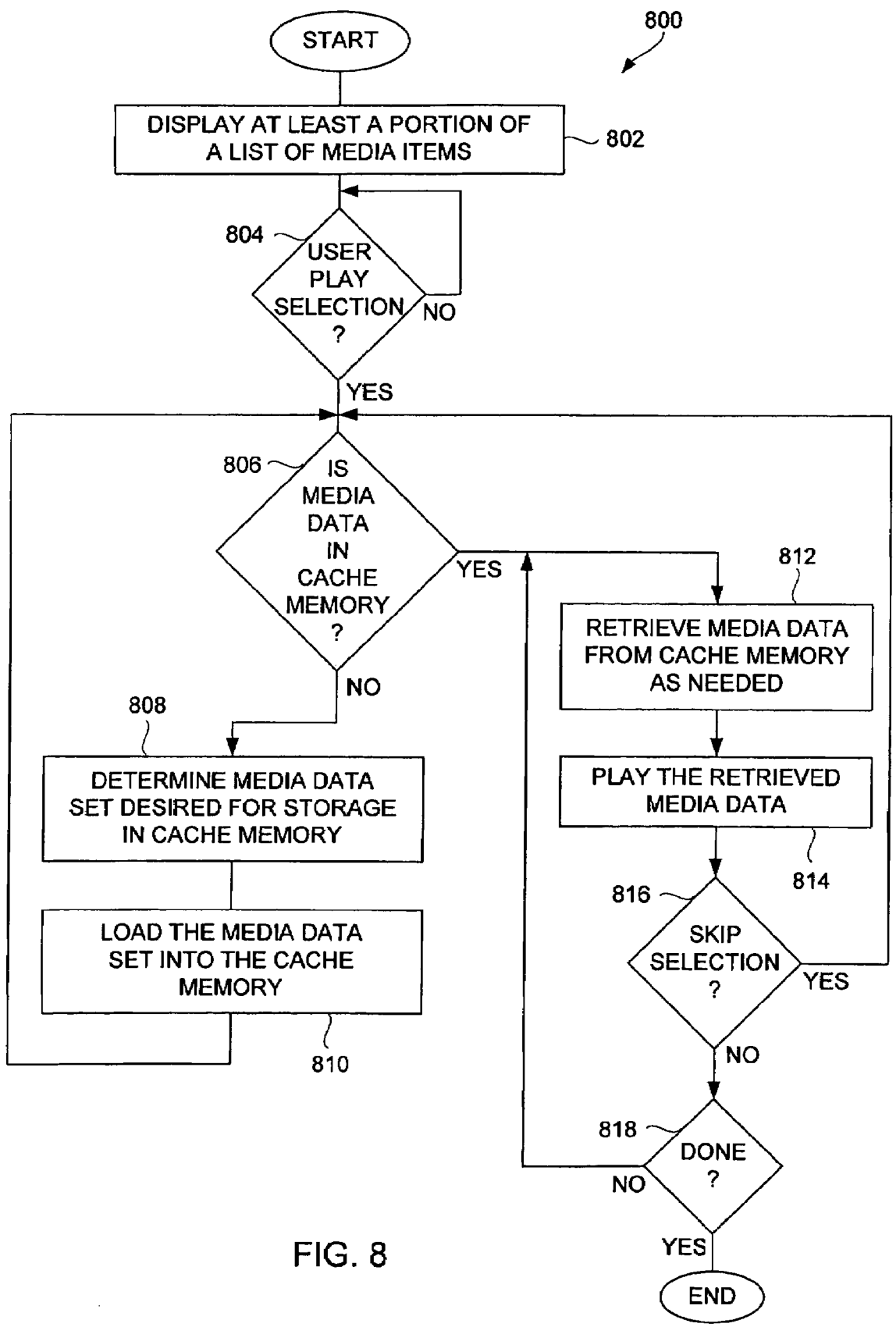
FIG. 8 is a flow diagram of play processing according to one embodiment of the invention.

FIG. 8 is a flow diagram of play processing 800 according to one embodiment of the invention. The play processing 800 is performed by a media device. More particularly, the play processing 800 is, for example, performed by a media access manager, such as the media access manager 124 illustrated in FIG. 1.

The play processing 800 initially displays 802 at least portion of a list of media items. A decision 804 then determines whether a user play selection has been made. When the decision 804 determines that a user play selection has not been made, then the play processing 800 awaits such a selection. Once the decision 804 determines that a user play selection has been made, a decision 806 determines whether the media data for the media item associated with the user play selection is already within the cache memory.

When the decision 806 determines that the required media data for the media item associated with the user play selection is not in the cache memory, then a media data set desired for storage in the cache memory is determined 808. The media data set can be determined 808 based on a variety of different criteria. The criteria can include user preference, user behavior, or be predetermined. After the media data set has been determined 808, the media data set is loaded 810 into the cache memory. Following the block 810, the play processing 800 returns to repeat the decision 806.

On the other hand, when the decision 806 determines that the required media data for the media item associated with the user play selection is already in the cache memory, the required media data is retrieved 812 from the cache memory as needed. The retrieved media data is then played 814. While the retrieved media data is being played, a user of the media device may enter a skip selection (skip request). When the decision 816 determines that a skip selection has been made, the play processing 800 returns to repeat the decision 806 to determine whether the media data for the next media item is within the cache memory. If the needed media data is already available in the cache memory, the needed media data can be retrieved 812 from the cache memory and then played 814. On the other hand, if the needed media data is not in cache memory, then operations 808 and 810 are performed to determine a new media data set and to load the new media data set into the cache memory. In this regard, to the extent that the cache memory supports the skip selection, there is no need to access a mass storage device, such as a disk drive, to retrieve the needed media data. As a result, the media device can be power efficient and very responsive to user skip selections. Additionally, it should be noted that a user may repeatedly enter a skip selection on rather short order (e.g., 30 seconds or less) and the process repeats for each skip selection.

Alternatively, when the decision 816 determines that a skip selection has not been made, a decision 818 determines whether playing of the media data is done (i.e., complete). When the decision 818 determines that the playing on the media data is not done, the play processing 800 returns to repeat the block 812 and subsequent blocks so that the remaining portion of the media item associated with the user play selection can be retrieved 812 and played 814.

Additionally, in some cases, the media device operates such that after the selected media item is completely played, a next media item of an ordered list can be automatically played. Hence, in such case, the processing for the next media item can be continued in the play processing 800 by returning to repeat the decision 806 for the next media item. In any case, when the decision 818 determines that the play processing 800 is done, the play processing 800 ends.

Figure 9:
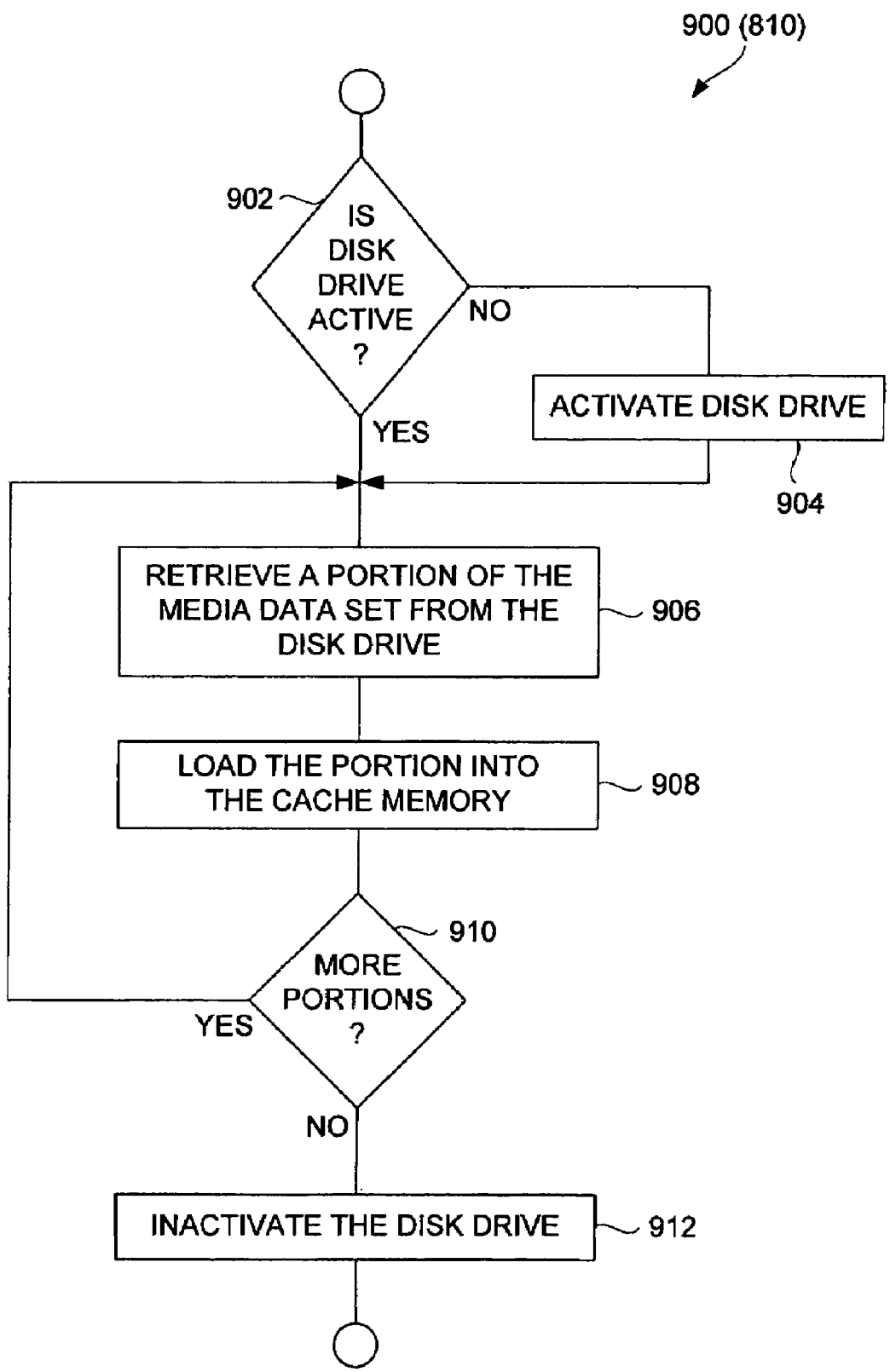
FIG. 9 is a flow diagram of a media data retrieval process according to one embodiment of the invention.

FIG. 9 is a flow diagram of a media data retrieval process 900 according to one embodiment of the invention. The media data retrieval process 900 is, for example, suitable for use as one embodiment for the block 810 illustrated in FIG. 8.

The media data retrieval process 900 begins with a decision 902. The decision 902 determines whether the disk drive providing mass storage for the media data pertaining to the media items is active. When the disk drive is not active, the disk drive is activated 904. When the disk drive is already active, the activation 904 of the disk drive is not required. Following the decision 902 when activation is not needed or following the activation 904 when activation is needed, a portion of the media data set is retrieved 906 from the disk drive. The portion is then loaded 908 into the cache memory. A decision 910 then determines whether there are more portions of the media data set that are to be retrieved. When the decision 910 determines that there are more portions to be retrieved, the media data retrieval process 900 returns to repeat the block 906 and subsequent blocks so that additional portions can be retrieved 906 and loaded 908. Alternatively, when the decision 910 determines that there are no more portions of the media data set the retrieved, the disk drive is inactivated 912.

According to another aspect, a media device can operate efficiently in a seek mode. The seek mode is an operational mode of the media device in which the media device automatically scans through media items in accordance with a predetermined timing. For example, a media device can present a series of media items to a user in brief fashion. In other words, the media device can allow a user to scan through a large set of media items by playing only an initial portion of each of the media items. The user can select a desired one of the media items during the seek process if so desired, whereby the selected media item could be played in its entirety.

Figure 10:
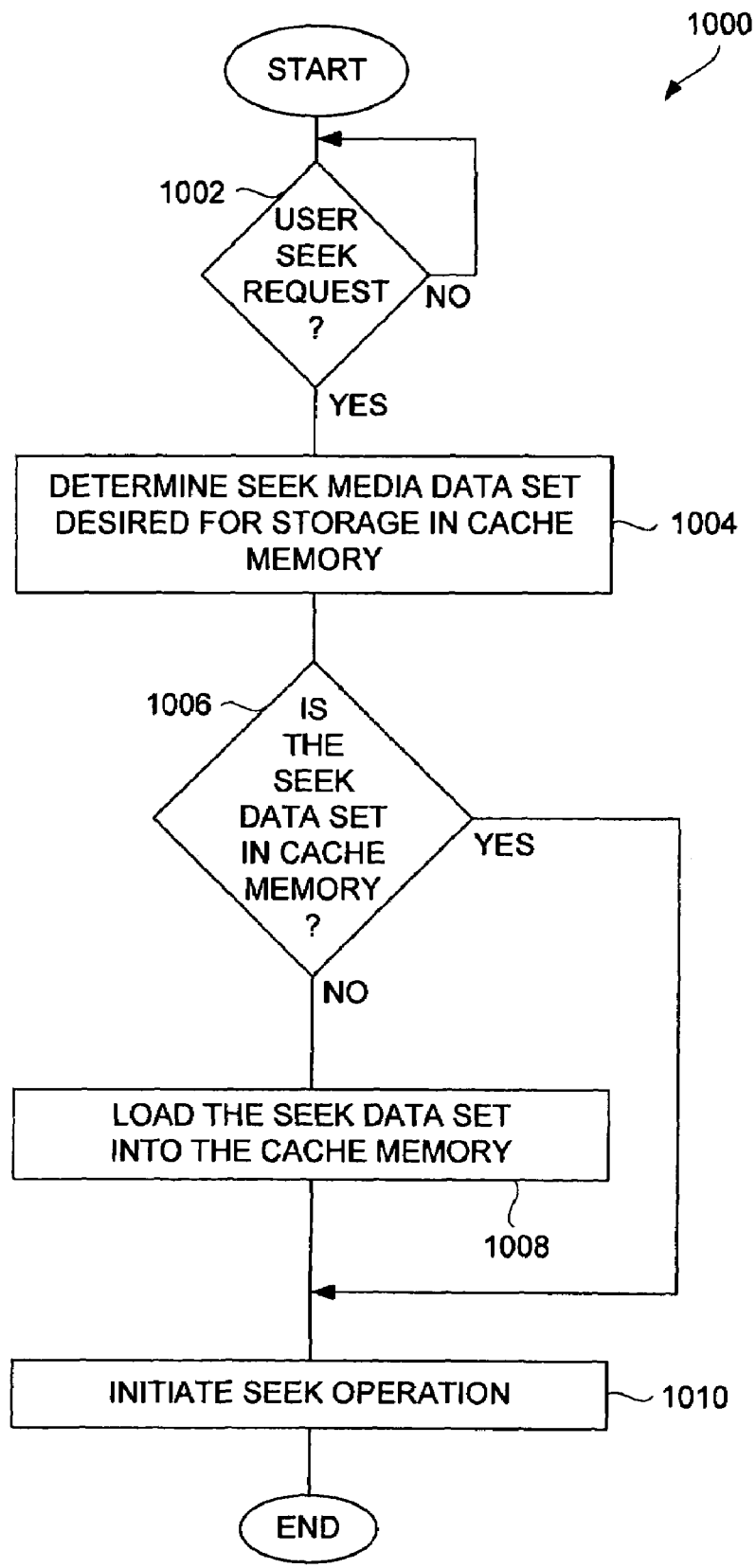
FIG. 10 illustrates a seek initiation process according to one embodiment of the invention.

FIG. 10 illustrates a seek initiation process 1000 according to one embodiment of the invention. The seek initiation process 1000 is performed by a media device. More particularly, the seek initiation process 1000 is, for example, performed by a media access manager, such as the media access manager 124 illustrated in FIG. 1.

The seek initiation process 1000 begins with a decision 1002 that determines whether a user seek request has been received. When the decision 1002 determines that a user seek request has not yet been received, the seek initiation process 1000 awaits such a request. Once the decision 1002 determines that a user seek request has been received, the seek initiation processing 1000 continues. In other words, the seek initiation process 1000 is effectively invoked when the user seek request is received.

When the seek initiation processing 1000 continues, a seek media data set is determined 1004. The seek media data set is the media data set that if desired to be stored in the cache memory during the seek mode. In this regard, the seek media data set is designed to facilitate efficient utilization of media device resources, including battery power, during a seek operation. For example, as noted above with respect FIG. 4C, the seek mode could be utilized such that the seek media data set does not store media data for full media items (e.g., songs), but instead in stores a large number of snippets for the media items.

After the seek media data set has been determined 1004, a decision 1006 then determines whether the seek media data set is already in the cache memory. When the decision 1006 determines that the seek media data set is not already in the cache memory, then the seek media data is loaded 1008 into the cache memory. On the other hand, when the decision 1006 determines that the seek media data set is already in the cache memory, then the block 1008 is bypassed. After the block 1008, or its being bypassed, the seek initiation processing 1000 initiates 1010 a seek operation. After the seek operation has been initiated 1010, the seek initiation processing 1000 ends. The seek operation operates to present a user with small portions of each of a large number of media items, thereby facilitating user's selection of a desired one of the media items to be presented in full.

Although the media items (or media assets) of emphasis in several of the above embodiments were audio items (e.g., audio files, such as for songs or audiobooks), the media items are not limited to audio items. For example, the media items can alternatively pertain to video items (e.g., video files or movies), or image items (e.g., photos).

The various aspects, embodiments, implementations or features of the invention can be used separately or in any combination.

The invention can be implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that a disk storage device that stores media items within a portable media device can be used less often, thereby enhancing battery life when being battery-powered. Another advantage of the invention is that a portable media device can intelligently load a cache memory so as to efficiently support successive skip requests by a user. Still another advantage of the invention is that a portable media device can intelligently load a cache memory so as to efficiently support a seek mode where small portions of a plurality of media items are successively presented to a user.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. In a media device that includes a cache memory and a storage device for storage of at least a media data file corresponding to a media item, a method comprising:

receiving an indication of a degree of skip support;

reserving a portion of the cache memory for storage of a number of media item snippets, wherein the number of media item snippets is directly related to the degree of skip support, and wherein each media item snippet includes only a portion of the actual media data itself for a respective media item;

receiving the number of media item snippets directly from the storage device;

storing the number of media item snippets only in the reserved portion of the cache memory;

in accordance with a media item selection by an end-user, playing the selected media item snippet directly from the cache memory;

skipping to another media item snippet when a skip request is received;

when the skip request is not received, downloading a remaining portion of the media data file corresponding to the played snippet directly from the storage device; and playing the remaining portion of the media data file.

2. The method as recited in claim 1, wherein the media device further includes a display screen, and
wherein said method further comprises:
displaying, prior to said receiving, at least a portion of a sequential list of media items on the display screen.

3. The method as recited in claim 1, wherein the media items are audio recordings.

4. The method as recited in claim 1, wherein a size of the media item snippet is related to end-user behavior.

5. The method as recited in claim 1, wherein the number of media item snippets are stored in the reserved portion of the cache memory prior to receiving the skip request.

6. The method as recited in claim 1, wherein at least one of said number of media item snippets includes only about 2% of the actual media data itself for its respective media item.

7. The method as recited in claim 1, wherein the reserved portion of the cache memory also stores 100% of the actual media data for one or more media items simultaneously with the number of media item snippets.

8. The method as recited in claim 1, wherein said method further comprises:
playing at least a portion of the selected media item at the media device using the corresponding media data from the cache memory.

9. The method as recited in claim 8, wherein said method further comprises:
receiving the skip request to play a next media item while the particular media item is being played; and
playing the next media item at the media device using the corresponding media data from the cache memory.

10. The method as recited in claim 9,
wherein, when the complete media data for the next media item has been loaded into the cache memory, the next media item can be played using the corresponding media data exclusively retrieved from the cache memory, and
wherein, when only the initial media data for the next media item has been loaded into the cache memory, the next media item can be initially played using the corresponding initial media data retrieved from the cache memory, and while the initial media data is played, the remaining media data corresponding to the next media item can be loaded into the cache memory provided there has not been another skip request during a time interval while a substantial portion of the initial media data is being played.

11. The method as recited in claim 1, further comprising:
determining the degree of skip support to be provided by the media device for skip operations that are expected to occur based upon previous end-user skip behavior;
determining media data stored in the storage device for transfer to and storage in the cache memory based on the degree of skip support; and
storing the determined media data into the cache memory before the skip request is received.

12. The method as recited in claim 11, wherein the determined media data is a media data set.

13. The method as recited in claim 11, wherein the degree of skip support is dependent on at least one of a user setting, a device or manufacturer setting.

14. Non-transitory computer readable medium for storing computer code executable by a processor in an autonomous media device that includes a cache memory and a storage device for storage of at least a media data file corresponding to a media item, comprising:
computer program code for receiving an indication of a degree of skip support;
reserving a portion of the cache memory for storage of a number of media item snippets, wherein the number of media item snippets is directly related to the degree of skip support, and wherein each media item snippet includes only a portion of the actual media data itself for a respective media item;
computer program code for storing the number of media item snippets only in the reserved portion of the cache memory;
computer program code for playing the selected media item snippet directly from the cache memory in accordance with a media item selection by an end-user;
computer program code for skipping to another media item snippet when a skip request is received;
computer program code for downloading a remaining portion of the media data file corresponding to the played snippet directly from the storage device when the skip request is not received; and
computer program code for playing the remaining portion of the media data file.

15. The computer readable medium as recited in claim 14, wherein the degree of skip support is dependent on at least one of a user setting, a device or manufacturer setting, and a user history.

16. The computer readable medium as recited in claim 14, wherein said computer readable medium further comprises:
computer program code for retrieving media data for the selected media item from the first memory;
computer program code for initiating playing of the retrieved media data corresponding to the selected media item;
computer program code for receiving a user skip selection for another media item from the media items;
computer program code for retrieving media data for the another media item from the first memory; and
computer program code for initiating playing of the retrieved media data corresponding to the another media item.

17. The computer readable medium as recited in claim 14, wherein the number of media item snippets are stored in the reserved portion of the cache memory prior to receiving the skip request.

18. The computer readable medium as recited in claim 14, wherein at least one of said number of media item snippets includes only about 2% of the actual media data itself for its respective media item.

19. The computer readable medium as recited in claim 14, wherein the reserved portion of the cache memory also stores 100% of the actual media data for one or more media items simultaneously with the number of media item snippets.

20. A consumer electronics product, comprising:
a user interface for receiving a user input event from an end-user;
a cache memory;
a storage device for storage of at least a media data file corresponding to a media item; and
a processor arranged to:
receive an indication of a degree of skip support from the user interface;
reserve a portion of the cache memory for storage of a number of media item snippets, wherein the number of media item snippets is directly related to the degree of skip support, and wherein each media item snippet includes only a portion of the actual media data itself for a respective media item;
store the number of media item snippets only in the reserved portion of the cache memory;

play a selected media item snippet directly from the cache memory in accordance with a media item selection received from the user interface;

skip to another media item snippet when a skip request is received from the user interface;

download a remaining portion of the media data file corresponding to the played snippet directly from the storage device when the skip request is not received; and play the remaining portion of the media data file.

21. The consumer electronics product as recited in claim 20, wherein the plurality of media items other than the particular media item are determined by said processor based on at least one of a user setting, a device or manufacturer setting, and a user history.

22. The consumer electronics product as recited in claim 20, wherein said consumer electronics product further comprises:

a display screen operatively connected to said processor, said display screen displays a list of the media items.

23. The consumer electronic product as recited in claim 20, wherein the number of media item snippets are stored in the reserved portion of the cache memory prior to receiving the skip request.

24. The consumer electronic product as recited in claim 20, wherein at least one of said number of media item snippets includes only about 2% of the actual media data itself for its respective media item.

25. The consumer electronic product as recited in claim 20, wherein the reserved portion of the cache memory also stores 100% of the actual media data for one or more media items simultaneously with the number of media item snippets.

26. The consumer electronics product as recited in claim 20, wherein said consumer electronics products is a portable, battery-operated media player.

27. The consumer electronics product as recited in claim 26, wherein the media player is an MP3 player, and wherein the media items include at least audio files of songs.

* * * * *